(12) United States Patent
Shiao

(10) Patent No.: US 12,365,627 B2
(45) Date of Patent: Jul. 22, 2025

(54) GRAPHENE COATINGS FOR ROOFING MATERIALS AND RELATED METHODS

(71) Applicant: BMIC LLC, Dallas, TX (US)

(72) Inventor: Ming-Liang Shiao, Basking Ridge, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/150,082

(22) Filed: Jan. 4, 2023

(65) Prior Publication Data

US 2023/0212071 A1 Jul. 6, 2023

Related U.S. Application Data

(63) Continuation of application No. 17/856,386, filed on Jul. 1, 2022, now Pat. No. 11,565,970.
(Continued)

(51) Int. Cl.
*C04B 20/12* (2006.01)
*C04B 20/10* (2006.01)
(Continued)

(52) U.S. Cl.
CPC ........ *C04B 20/123* (2013.01); *C04B 20/1037* (2013.01); *C04B 20/1059* (2013.01);
(Continued)

(58) Field of Classification Search
CPC .............. C04B 20/123; C04B 20/1037; C04B 20/1059; C04B 20/1074; C04B 26/26; C04B 2103/54; C04B 2111/00586; E04D 1/20; E04D 2001/005; Y02A 30/254; Y02B 80/00
See application file for complete search history.

(56) References Cited

U.S. PATENT DOCUMENTS 5,851,338 A 12/1998 Pushaw
5,932,134 A 8/1999 Christ et al.
(Continued)

FOREIGN PATENT DOCUMENTS

WO 2021/212155 A1 10/2021

OTHER PUBLICATIONS

Zurutuza, A., Apr. 16, 2021 (Acrhived), Graphene & Graphite—How Do They Compare?, Graphenea (Year: 2021).*
(Continued)

*Primary Examiner* — Nathan L Van Sell
(74) *Attorney, Agent, or Firm* — GREENBERG TRAURIG, LLP

(57) ABSTRACT

Some embodiments of the present disclosure relate to a roofing material, wherein the roofing material may comprise a plurality of coated roofing granules, wherein each of the plurality of the coated roofing granules may comprise a roofing granule having an outer surface; and a granule coating, wherein the granule coating is disposed on at least a portion of the outer surface of the roofing granule, and wherein the granule coating comprises graphene. Some embodiments of the present disclosure relate to a roofing material, wherein the roofing material may further comprise a reflective base coating, wherein the reflective base coating is positioned between the outer surface of the roofing granule and the granule coating.

20 Claims, 4 Drawing Sheets

Related U.S. Application Data

(60) Provisional application No. 63/217,623, filed on Jul. 1, 2021.

(51) Int. Cl.

| | | |
|---|---|---|
| *C04B 26/26* | (2006.01) | |
| *C04B 103/54* | (2006.01) | |
| *C04B 111/00* | (2006.01) | |
| *E04D 1/00* | (2006.01) | |
| *E04D 1/20* | (2006.01) | |

(52) U.S. Cl.
CPC .......... *C04B 20/1074* (2013.01); *C04B 26/26* (2013.01); *E04D 1/20* (2013.01); *C04B 2103/54* (2013.01); *C04B 2111/00586* (2013.01); *E04D 2001/005* (2013.01)

(56) References Cited

U.S. PATENT DOCUMENTS

| | | | |
|---|---|---|---|
| 5,955,188 | A | 9/1999 | Pushaw |
| 6,001,272 | A | 12/1999 | Ikuma et al. |
| 7,238,408 | B2 | 7/2007 | Aschenbeck et al. |
| 7,348,374 | B2 | 3/2008 | Martinazzo |
| 7,838,108 | B2 | 11/2010 | Thiagarajan et al. |
| 8,484,918 | B2 | 7/2013 | Merkel |
| 8,486,522 | B2 | 7/2013 | Jokisch et al. |
| 8,613,881 | B2 | 12/2013 | Soong |
| 8,753,473 | B2 | 6/2014 | Merkel |
| 8,968,853 | B2 | 3/2015 | Zhou et al. |
| 9,447,581 | B2 | 9/2016 | Harrington et al. |
| 9,523,203 | B2 | 12/2016 | Zhou et al. |
| 9,593,224 | B2 | 3/2017 | Liu et al. |
| 9,725,907 | B2 | 8/2017 | Harrington et al. |
| 9,920,200 | B2 | 3/2018 | Zhou et al. |
| 9,944,793 | B2 | 4/2018 | Eling et al. |
| 10,155,866 | B2 | 12/2018 | Le et al. |
| 10,273,693 | B2 | 4/2019 | Zhou et al. |
| 10,391,676 | B2 | 8/2019 | Tamai et al. |
| 10,458,119 | B2 | 10/2019 | Grubka et al. |
| 10,538,683 | B2 | 1/2020 | Lewis |
| 10,834,584 | B2 | 11/2020 | Shet et al. |
| 11,565,970 | B1 | 1/2023 | Shiao |
| 2005/0072110 | A1 | 4/2005 | Shiao et al. |
| 2005/0123743 | A1 | 6/2005 | Martinazzo |
| 2008/0187739 | A1 | 8/2008 | Baker et al. |
| 2008/0261471 | A1 | 10/2008 | Chen et al. |
| 2008/0265457 | A1 | 10/2008 | McLeod et al. |
| 2009/0029147 | A1 | 1/2009 | Tang et al. |
| 2009/0047502 | A1 | 2/2009 | Folaron et al. |
| 2009/0148665 | A1 | 6/2009 | Thiagarajan et al. |
| 2009/0317593 | A1 | 12/2009 | Smith et al. |
| 2010/0089002 | A1 | 4/2010 | Merkel |
| 2011/0008622 | A1 | 1/2011 | Kalkanoglu et al. |
| 2012/0034424 | A1 | 2/2012 | Hong et al. |
| 2012/0092105 | A1 | 4/2012 | Weinberg et al. |
| 2013/0295338 | A1 | 11/2013 | Keating et al. |
| 2013/0337258 | A1 | 12/2013 | Schwendeman et al. |
| 2014/0124977 | A1 | 5/2014 | Merkel |
| 2015/0210599 | A1 | 7/2015 | Nozato et al. |
| 2015/0252566 | A1* | 9/2015 | Tangeman ............ C03C 17/007 502/232 |
| 2015/0259919 | A1 | 9/2015 | Lewis |
| 2015/0307668 | A1* | 10/2015 | Kalgutkar ......... C08F 220/1818 528/26 |
| 2015/0346398 | A1 | 12/2015 | Gorodetsky et al. |
| 2017/0246659 | A1 | 8/2017 | Becker, IV |
| 2017/0326823 | A1 | 11/2017 | Kushalappa et al. |
| 2018/0187419 | A1 | 7/2018 | Lai et al. |
| 2019/0153722 | A1 | 5/2019 | Schmetzer et al. |
| 2020/0224419 | A1 | 7/2020 | Boss et al. |
| 2021/0040743 | A1 | 2/2021 | Boss et al. |
| 2021/0276920 | A1 | 9/2021 | Kondratowicz et al. |
| 2021/0292491 | A1 | 9/2021 | Ouchiyama et al. |

OTHER PUBLICATIONS

Author Unknown, Graphene in Coatings: Overcoming the Challenges to Reap the Benefits, Oct. 2020, CoatingsTech, vol. 17, No. 10 (Year: 2020).*

English Translation of Bu et al (CN 109913090 A) (Year: 2019).*

"What is Graphene and How Can It Protect Metal Roofs?"; Alltime Coatings: Dec. 15, 2020.

Lin et al., "Orientation Control of Graphene Flakes by Magnetic Field: Broad Device Applications of Macroscopically Aligned Graphene", Advanced Materials, Nov. 2016.

Tian et al., "Magnetically-induced alignment of graphene via Landau diamagnetism," Carbon 131 (2018) 66-71.

* cited by examiner

GRAPHENE COATINGS FOR ROOFING MATERIALS AND RELATED METHODS

CROSS-REFERENCE TO RELATED APPLICATIONS

The present application is a continuation of U.S. patent application Ser. No. 17/856,386, filed Jul. 1, 2022, and entitled "GRAPHENE-CONTAINING ROOFING MATERIALS AND RELATED METHODS," which claims priority to and benefit of U.S. provisional patent application No. 63/217,623, filed Jul. 1, 2021, and entitled "GRAPHENE-CONTAINING COATINGS FOR ROOFING MATERIALS AND RELATED METHODS," the contents of which are incorporated herein in their entirety for all purposes.

FIELD

This disclosure generally relates to graphene-containing roofing materials and related methods.

BACKGROUND

Dark colored roofing shingles have low solar heat reflectivity. This leads to elevated roofing temperatures and, consequently, greater energy requirements to cool the spaces covered by the dark colored roofing shingles.

SUMMARY

Some embodiments of the present disclosure relate to a roofing material. In some embodiments, the roofing material may comprise, consist of, or consist essentially of a plurality of coated roofing granules. In some embodiments, each of the plurality of the coated roofing granules may comprise, consist of, or consist essentially of a roofing granule and a granule coating. In some embodiments, the roofing granule may have an outer surface. In some embodiments, the granule coating may be disposed on at least a portion of the outer surface of the roofing granule. In some embodiments, the granule coating may comprise, consist of, or consist essentially of graphene.

In some embodiments, the graphene may be present in the granule coating in an amount of 0.1% to 10% by weight based on a total weight of the granule coating.

In some embodiments, the granule coating may further comprise at least one of a metal silicate binder, a phosphate binder, a fluoropolymer coating, an acrylic coating, a polyurethane coating, a sol-gel coating, a silica coating, or any combination thereof.

In some embodiments, the granule coating may further comprise at least one of a latent heat reactant, a dispersing agent, a curing agent, an accelerator, a viscosity modifier, a color pigment, or any combination thereof.

In some embodiments, the granule coating may further comprise a polymer.

In some embodiments, the roofing material may have a CIELAB color value comprising an L* value of 50 or less. In some embodiments, the roofing material may have a CIELAB color value comprising an L* value range of $0<L^*<40$. In some embodiments, the roofing material may have a CIELAB color value comprising an L* value range of $0<L^*<30$.

In some embodiments, a total solar reflectance of the granule coating may be at least 10% greater than a granule coating control, wherein the granule coating control does not comprise graphene, wherein the total solar reflectance is measured via a portable reflectometer according to ASTM C1549. In some embodiments, a total solar reflectance of the granule coating may be at least 15% greater than a granule coating control, wherein the granule coating control does not comprise graphene, wherein the total solar reflectance is measured via a portable reflectometer according to ASTM C1549.

In some embodiments, the granule coating may cover 25% to 100% of the outer surface of the roofing granule. In some embodiments, the roofing material may further comprise a reflective base coating, wherein the reflective base coating is positioned between the outer surface of the roofing granule and the granule coating. In some embodiments, the reflective base coating may comprise at least one of a reflective pigment, a transitional metal oxide, a cool pigment, a metallic pigment, a metallic particle, a mirrored pigment, a light scattering additive, an opacifier, a thin-film coated particle, or a combination thereof. In some embodiments, the reflective base coating may comprise a plurality of voids.

In some embodiments, the granule coating may have a thickness of 50 mil or less. In some embodiments, the granule coating may have a thickness of 25 mil or less. In some embodiments, the granule coating may have a thickness of 0.1 mil to 50 mil.

In some embodiments, a roofing shingle may comprise the roofing material of the present disclosure.

Some embodiments of the present disclosure relate to a roofing shingle. In some embodiments, the roofing shingle may comprise, consist of, or consist essentially of a substrate and a plurality of coated roofing granules. In some embodiments, the plurality of the coated roofing granules may be disposed on the substrate. In some embodiments, each of the plurality of the coated roofing granules may comprise, consist of, or consist essentially of a roofing granule and a granule coating. In some embodiments, the roofing granule may have an outer surface. In some embodiments, the granule coating may be disposed on at least a portion of the outer surface of the roofing granule. In some embodiments, the granule coating may comprise, consist of, or consist essentially of graphene. In some embodiments, the granule coating may have a CIELAB color value comprising an L* value range of $0<L^*<40$. In some embodiments, a total solar reflectance of the roofing shingle may be at least 10% greater than a roofing shingle control. In some embodiments, the roofing shingle control does not comprise graphene. In some embodiments, the total solar reflectance of the roofing shingle may be measured via a portable reflectometer according to ASTM C1549.

In some embodiments, the roofing shingle may be a non-asphaltic roofing shingle. In some embodiments, the roofing shingle may be an asphaltic roofing shingle.

In some embodiments, the roofing shingle may further comprise roofing granules having a reflective base coating, wherein the reflective base coating is positioned between the outer surface of the roofing granule and the granule coating.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
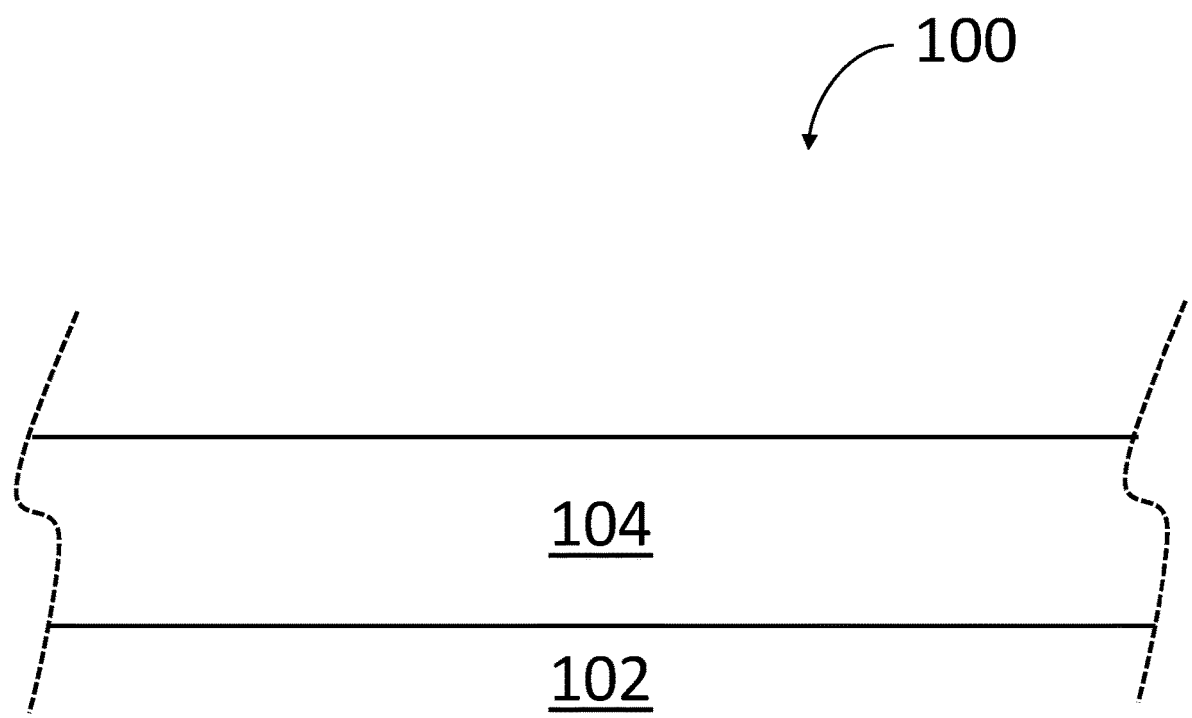
FIG. 1 is a cross-section of at least a portion of a coated roofing granule, according to some embodiments of the present disclosure.

Some embodiments of the present disclosure relate to graphene-containing roofing materials and related methods. In some embodiments, a graphene is applied to a roofing material to improve at least one property (e.g., a surface property) of the roofing material. In some embodiments, the graphene may reduce solar heat absorption of the roofing material. In some embodiments, the graphene may increase total solar reflectance (TSR) of the roofing material. In some embodiments, the graphene may improve aesthetics of the roofing material by, for example, imparting or retaining a dark appearance of the roofing material. In some embodiments, the graphene may reduce algae growth (e.g., without use of any heavy metal biocides) on the roofing material. In some embodiments, the graphene may reduce leaching of iron ions thereby reducing rusting potential of the roofing material. In some embodiments, the graphene may improve color lightfastness for organic pigments or dyes. In some embodiments, the graphene may impart ultraviolet (UV) opacity to the roofing material.

As used herein, the term "roofing material" includes, without limitation, shingles, granules, waterproofing membranes, underlayment, tiles, or any combination thereof. For example, in some embodiments, the roofing material may comprise, consist of, or consist essentially of at least one of a roofing shingle, at least one roofing granule (e.g., at least one of a plurality of roofing granules, a plurality of coated roofing granules, or any combination thereof), or any combination thereof. In some embodiments, the roofing shingle may comprise, consist of, or consist essentially of at least one of an asphaltic roofing shingle (e.g., a shingle or a coating disposed on a shingle comprising 0.1% to 49% by weight of asphalt), a non-asphaltic roofing shingle (e.g., a shingle or a coating disposed on a shingle does not comprise asphalt), or any combination thereof.

As used herein, the term "graphene" refers to a type of carbon nanomaterial. For example, in some embodiments, the term graphene refers to a two-dimensional arrangement of carbon atoms (i.e., a single layer of atoms arranged in a two-dimensional honeycomb lattice).

In some embodiments, a roofing material may comprise, consist of, or consist essentially of at least one of a substrate, at least one roofing granule (e.g., a plurality of roofing granules, a plurality of coated roofing granules, or any combination thereof), a granule coating (e.g., a granule coating which does not comprise graphene), a graphene-containing granule coating (e.g., a granule coating comprising, consisting of, or consisting essentially of graphene), a graphene (e.g., a plurality of graphene particles), a reflective base coating, or any combination thereof.

In some embodiments, the roofing material may comprise, consist of, or consist essentially of the at least one roofing granule (e.g., the plurality of the roofing granules, the plurality of the coated roofing granules, or any combination thereof) and the graphene-containing granule coating (e.g., the granule coating comprising, consisting of, or consisting essentially of graphene). In some embodiments, the roofing material may comprise, consist of, or consist essentially of the at least one roofing granule (e.g., the plurality of the roofing granules, the plurality of the coated roofing granules, or any combination thereof) and the graphene (e.g., the plurality of graphene particles). In some embodiments, the roofing material may comprise, consist of, or consist essentially of the at least one roofing granule (e.g., the plurality of the roofing granules, the plurality of the coated roofing granules, or any combination thereof) and the reflective base coating. In some embodiments, the roofing material may comprise, consist of, or consist essentially of the at least one roofing granule (e.g., the plurality of the roofing granules, the plurality of the coated roofing granules, or any combination thereof), the graphene-containing granule coating (e.g., the granule coating comprising, consisting of, or consisting essentially of graphene), and the reflective base coating. In some embodiments, the roofing material may comprise, consist of, or consist essentially of the at least one roofing granule (e.g., the plurality of the roofing granules, the plurality of the coated roofing granules, or any combination thereof), a granule coating (e.g., the granule coating which does not comprise graphene), the graphene (e.g., the plurality of graphene particles), and the reflective base coating. In some embodiments, the roofing material does not comprise an infrared reflective pigment.

In some embodiments, the roofing material may comprise, consist of, or consist essentially of the substrate and the at least one roofing granule (e.g., the plurality of the roofing granules, the plurality of the coated roofing granules, or any combination thereof). In some embodiments, the roofing material may comprise, consist of, or consist essentially of the substrate, the at least one roofing granule (e.g., the plurality of the roofing granules, the plurality of the coated roofing granules, or any combination thereof), and the graphene-containing granule coating (e.g., the granule coating comprising, consisting of, or consisting essentially of graphene). In some embodiments, the roofing material may comprise, consist of, or consist essentially of the substrate, the at least one roofing granule (e.g., the plurality of the roofing granules, the plurality of the coated roofing granules, or any combination thereof), and the graphene (e.g., the plurality of graphene particles). In some embodiments, the roofing material may comprise, consist of, or consist essentially of the substrate, the at least one roofing granule (e.g., the plurality of the roofing granules, the plurality of the coated roofing granules, or any combination thereof), and the reflective base coating. In some embodiments, the roofing material may comprise, consist of, or consist essentially of the substrate, the at least one roofing granule (e.g., the plurality of the roofing granules, the plurality of the coated roofing granules, or any combination thereof), the graphene-containing granule coating (e.g., the granule coating comprising, consisting of, or consisting essentially of graphene), and the reflective base coating. In some embodiments, the roofing material may comprise, consist of, or consist essentially of the substrate, the at least one roofing granule (e.g., the plurality of the roofing granules, the plurality of the coated roofing granules, or any combination thereof), the graphene (e.g., the plurality of graphene particles), and the reflective base coating.

In some embodiments, the roofing material may comprise, consist of, or consist essentially of the plurality of the coated roofing granules. In some embodiments, the plurality of the coated roofing granules may be disposed on the substrate. In some embodiments, each of the plurality of the coated roofing granules may comprise, consist of, or consist essentially of at least one of the roofing granule, the granule coating, the graphene-containing granule coating, the graphene, the reflective base coating, or any combination thereof.

In some embodiments, the roofing granule may have an outer surface. In some embodiments, at least one of the graphene-containing granule coating, the reflective base coating, or any combination thereof may be disposed on at least a portion of the outer surface of the roofing granule. In some embodiments, each of the plurality of the coated roofing granules may comprise, consist of, or consist essentially of the roofing granule having the outer surface and the graphene-containing granule coating disposed on at least a portion of the outer surface of the roofing granule. In some embodiments, each of the plurality of the coated roofing granules may comprise, consist of, or consist essentially of the roofing granule having the outer surface, the graphene-containing granule coating disposed on at least a portion of the outer surface of the roofing granule, and the reflective base coating disposed on at least a portion of the outer surface of the roofing granule. In some embodiments, the reflective base coating may be disposed between the outer surface of the roofing granule and the graphene-containing granule coating. In some embodiments, the graphene-containing granule coating may be disposed between the outer surface of the roofing granule and the reflective base coating. In some embodiments, the graphene-containing granule coating and the reflective base coating are combined to form a single coating.

In some embodiments, the roofing granule may have an outer surface. In some embodiments, at least one of the granule coating, the plurality of graphene particles, the reflective base coating, or any combination thereof may be disposed on at least a portion of the outer surface of the roofing granule. In some embodiments, each of the plurality of the coated roofing granules may comprise, consist of, or consist essentially of the roofing granule having the outer surface and the granule coating disposed on at least a portion of the outer surface of the roofing granule. In some embodiments, each of the plurality of the coated roofing granules may comprise, consist of, or consist essentially of the roofing granule having the outer surface, the granule coating disposed on at least a portion of the outer surface of the roofing granule, and the plurality of graphene particles disposed on at least a portion of an outer surface of the granule coating. In some embodiments, each of the plurality of the coated roofing granules may comprise, consist of, or consist essentially of the roofing granule having the outer surface, the granule coating disposed on at least a portion of the outer surface of the roofing granule, the plurality of graphene particles disposed on at least a portion of the outer surface of the roofing granule, and the reflective base coating disposed on at least a portion of the outer surface of the roofing granule. In some embodiments, the reflective base coating may be disposed between the outer surface of the roofing granule and the granule coating. In some embodiments, the granule coating may be disposed between the outer surface of the roofing granule and the reflective base coating. In some embodiments, the granule coating and the reflective base coating are combined to form a single coating. In some embodiments, the plurality of graphene particles may be disposed on an outer surface of the granule coating. In some embodiments, the plurality of graphene particles may be dispose don an outer surface of the reflective base coating.

In some embodiments, the substrate may comprise, consist of, or consist essentially of at least one of a plywood substrate, a glass substrate, a cellulosic substrate, a roof shingle, a glass mat, a fiberglass mat, an underlayment, a roofing membrane, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, or any combination thereof), a pipe, a base sheet, a chimney, a wax paper, or any combination thereof. In some embodiments, the substrate comprises asphalt. In some embodiments, the substrate does not comprise asphalt.

In some embodiments, the roofing granule may comprise, consist of, or consist essentially of at least one of fines, granules, sand, metal flakes, reflective granules, ceramic granules, clay granules, composite particles comprising filled plastics (e.g., composite particles made with highly filled plastics), polymer-based granules, or any combination thereof. In some embodiments, the roofing granule may comprise, consist of, or consist essentially of at least one of greenstone, nephelene syenite, common gravel, slate, gannister, quartz, quartzite, greystone, argillite, coal slag, copper slag, nickel slag, ceramic grog, talc, granite, siliceous sand, andesite, porphyry, marble, syenite, rhyolite, diabase, quartz, slate, basalt, sandstone, marine shell, a material derived from a recycled manufactured good (e.g., at least one of a brick, a concrete, a porcelain, or any combination thereof), or any combination thereof. In some embodiments, the roofing granule may comprise a shape of or may comprise a shape resembling a sphere, a flake, a plate, a rod, or any combination thereof.

In some embodiments, the granule coating may comprise, consist of, or consist essentially of at least one additive. In some embodiments, the granule coating does not comprise graphene. In some embodiments, the granule coating may comprise, consist of, or consist essentially of at least one of graphene, at least one additive, or any combination thereof. In some embodiments, the granule coating is a graphene-containing granule coating comprising, consisting of, or consisting essentially of graphene and at least one additive. In some embodiments, the graphene-containing granule coating is a granule coating comprising, consisting of, or consisting essentially of at least one of graphene, at least one additive, or any combination thereof. In some embodiments, the graphene-containing granule coating is prepared from a graphene-containing granule coating material. In some embodiments, the graphene-containing granule coating material is a granule coating material comprising, consisting of, or consisting essentially of at least one of graphene, at least one additive, or any combination thereof. In some embodiments, the graphene-containing granule coating may not comprise a carbon nanomaterial other than graphene. For example, in some embodiments, the graphene-containing granule coating may not comprise at least one of a graphite, a carbon nanotube, a fullerene, a composite thereof, or any combination thereof.

In some embodiments, the graphene may comprise, consist of, or consist essentially of a carbon nanomaterial. In some embodiments, the graphene may comprise, consist of, or consist essentially of a two-dimensional arrangement of carbon atoms. In some embodiments, the graphene may comprise, consist of, or consist essentially of a single layer of atoms arranged in a two-dimensional lattice (e.g., a two-dimensional honeycomb lattice, etc.). In some embodiments, the graphene is present in a form of at least one of a powder, a pellet, a flake, a rod, a fiber, a sphere, a film, an agglomerate, or any combination thereof. For example, in some embodiments, the graphene may comprise, consist of, or consist essentially of graphene particles, such as, for example, graphene nanoparticles. In some embodiments, the graphene is a plurality of graphene particles. In some embodiments, the graphene may be combined with or replaced by at least one other carbon nanomaterial. Examples of carbon nanomaterials include, without limitation, graphene, graphite, carbon nanostructures (e.g., carbon nanotubes, etc.), fullerenes, or any combination thereof. In some embodiments, the graphene may be combined with or replaced by at least one of a graphene, a graphite, a carbon nanotube, a fullerene, a composite thereof, or any combination thereof. In some embodiments, the term graphene refers to graphene combined with at least one of a graphite, a carbon nanotube, a fullerene, or any combination thereof to form a composite. In some embodiments, the term graphene refers to graphene only. For example, in some embodiments, the graphene may not be combined with any other carbon nanomaterial.

In some embodiments, the graphene comprises no more than 4% by weight of impurities based on a total weight of the graphene. In some embodiments, the graphene comprises no more than 3% by weight of impurities based on the total weight of the graphene. In some embodiments, the graphene comprises no more than 2% by weight of impurities based on the total weight of the graphene. In some embodiments, the graphene comprises no more than 1% by weight of impurities based on the total weight of the graphene. In some embodiments, the graphene comprises 0.01% to 4% by weight of impurities based on the total weight of the graphene. In some embodiments, the graphene comprises 0.01% to 3.5% by weight of impurities based on the total weight of the graphene. In some embodiments, the graphene comprises 0.01% to 3% by weight of impurities based on the total weight of the graphene. In some embodiments, the graphene comprises 0.01% to 2.5% by weight of impurities based on the total weight of the graphene. In some embodiments, the graphene comprises 0.01% to 2% by weight of impurities based on the total weight of the graphene. In some embodiments, the graphene comprises 0.01% to 1.5% by weight of impurities based on the total weight of the graphene. In some embodiments, the graphene comprises 0.01% to 1% by weight of impurities based on the total weight of the graphene. In some embodiments, the graphene comprises 0.01% to 0.5% by weight of impurities based on the total weight of the graphene. In some embodiments, the graphene comprises 0.5% to 4% by weight of impurities based on the total weight of the graphene. In some embodiments, the graphene comprises 1% to 4% by weight of impurities based on the total weight of the graphene. In some embodiments, the graphene comprises 1.5% to 4% by weight of impurities based on the total weight of the graphene. In some embodiments, the graphene comprises 2% to 4% by weight of impurities based on the total weight of the graphene. In some embodiments, the graphene comprises 2.5% to 4% by weight of impurities based on the total weight of the graphene. In some embodiments, the graphene comprises 3% to 4% by weight of impurities based on the total weight of the graphene. In some embodiments, the graphene comprises 3.5% to 4% by weight of impurities based on the total weight of the graphene. In some embodiments, the impurities comprise any substance other than graphene.

As used herein, the term "lateral size" of the graphene refers to a dimension or an average dimension of at least a portion of the graphene. In some embodiments, the lateral size of graphene may depend on a shape or a general shape of the graphene, a form of the graphene (e.g., as a powder, a pellet, a sheet, etc.), a type of the graphene (e.g., carbon nanotubes, graphite, etc.), or any combination thereof. In some embodiments, for example, the lateral size of graphene may refer to at least one of a radius, a diameter, a length, a width, a diagonal, or any combination thereof.

In some embodiments, a lateral size of the graphene is 800 µm or less. In some embodiments, the lateral size of the graphene is 600 µm or less. In some embodiments, the lateral size of the graphene is 500 µm or less. In some embodiments, the lateral size of the graphene is 400 µm or less. In some embodiments, the lateral size of the graphene is 300 µm or less. In some embodiments, the lateral size of the graphene is 200 µm or less. In some embodiments, the lateral size of the graphene is 0.01 nm to 800 nm. In some embodiments, the lateral size of the graphene is 5 nm to 800 nm. In some embodiments, the lateral size of the graphene is 10 nm to 500 nm. In some embodiments, the lateral size of the graphene is 10 nm to 400 nm. In some embodiments, the lateral size of the graphene is 10 nm to 200 nm. In some embodiments, the lateral size of the graphene is 5 nm to 150 nm. In some embodiments, the lateral size of the graphene is 10 nm to 500 µm. In some embodiments, the lateral size of the graphene is 50 nm to 500 µm. In some embodiments, the lateral size of the graphene is 100 nm to 500 µm. In some embodiments, the lateral size of the graphene is 200 nm to 500 µm. In some embodiments, the lateral size of the graphene is 200 nm to 20 µm. In some embodiments, the lateral size of the graphene is 500 nm to 5 µm. In some embodiments, the lateral size of the graphene is 5 µm to 20 µm. In some embodiments, the lateral size of the graphene is 200 nm to 500 nm. In some embodiments, the lateral size of the graphene is 0.5 µm to 5 µm.

In some embodiments, the lateral size of the graphene is 1 nm to 100 µm. In some embodiments, the lateral size of the graphene is 1 nm to 90 µm. In some embodiments, the lateral size of the graphene is 1 nm to 80 µm. In some embodiments, the lateral size of the graphene is 1 nm to 70 µm. In some embodiments, the lateral size of the graphene is 1 nm to 60 µm. In some embodiments, the lateral size of the graphene is 1 nm to 50 µm. In some embodiments, the lateral size of the graphene is 1 nm to 40 µm. In some embodiments, the lateral size of the graphene is 1 nm to 30 µm. In some embodiments, the lateral size of the graphene is 1 nm to 20 µm. In some embodiments, the lateral size of the graphene is 1 nm to 10 µm. In some embodiments, the lateral size of the graphene is 10 nm to 100 µm. In some embodiments, the lateral size of the graphene is 20 nm to 100 µm. In some embodiments, the lateral size of the graphene is 30 nm to 100 µm. In some embodiments, the lateral size of the graphene is 40 nm to 100 µm. In some embodiments, the lateral size of the graphene is 50 nm to 100 µm. In some embodiments, the lateral size of the graphene is 60 nm to 100 µm. In some embodiments, the lateral size of the graphene is 70 nm to 100 µm. In some embodiments, the lateral size of the graphene is nm to 100 µm. In some embodiments, the lateral size of the graphene is 80 nm to 100 µm. In some embodiments, the lateral size of the graphene is 90 nm to 100 µm. In some embodiments, the lateral size of the graphene is 10 nm to 70 µm. In some embodiments, the lateral size of the graphene is 1 µm to 2 µm.

In some embodiments, the graphene may be present in the granule coating, the granule coating material, or any combination thereof in an amount of 0.001% to 20% by weight based on a total weight of the granule coating, the granule coating material, or any combination thereof. In some embodiments, the graphene may be present in the granule coating, the granule coating material, or any combination thereof in an amount of 0.1% to 19% by weight based on the total weight of the granule coating, the granule coating material, or any combination thereof. In some embodiments, the graphene may be present in the granule coating, the granule coating material, or any combination thereof in an amount of 0.1% to 18% by weight based on the total weight of the granule coating, the granule coating material, or any combination thereof. In some embodiments, the graphene may be present in the granule coating, the granule coating material, or any combination thereof in an amount of 0.1% to 17% by weight based on the total weight of the granule coating, the granule coating material, or any combination thereof. In some embodiments, the graphene may be present in the granule coating, the granule coating material, or any combination thereof in an amount of 0.1% to 16% by weight based on the total weight of the granule coating, the granule coating material, or any combination thereof. In some embodiments, the graphene may be present in the granule coating, the granule coating material, or any combination thereof in an amount of 0.1% to 15% by weight based on the total weight of the granule coating, the granule coating material, or any combination thereof. In some embodiments, the graphene may be present in the granule coating, the granule coating material, or any combination thereof in an amount of 0.1% to 14% by weight based on the total weight of the granule coating, the granule coating material, or any combination thereof. In some embodiments, the graphene may be present in the granule coating, the granule coating material, or any combination thereof in an amount of 0.1% to 13% by weight based on the total weight of the granule coating, the granule coating material, or any combination thereof. In some embodiments, the graphene may be present in the granule coating, the granule coating material, or any combination thereof in an amount of 0.1% to 12% by weight based on the total weight of the granule coating, the granule coating material, or any combination thereof. In some embodiments, the graphene may be present in the granule coating, the granule coating material, or any combination thereof in an amount of 0.1% to 11% by weight based on the total weight of the granule coating, the granule coating material, or any combination thereof. In some embodiments, the graphene may be present in the granule coating, the granule coating material, or any combination thereof in an amount of 0.1% to 10% by weight based on the total weight of the granule coating, the granule coating material, or any combination thereof. In some embodiments, the graphene may be present in the granule coating, the granule coating material, or any combination thereof in an amount of 0.1% to 9.5% by weight based on the total weight of the granule coating, the granule coating material, or any combination thereof. In some embodiments, the graphene may be present in the granule coating, the granule coating material, or any combination thereof in an amount of 0.1% to 9% by weight based on the total weight of the granule coating, the granule coating material, or any combination thereof. In some embodiments, the graphene may be present in the granule coating, the granule coating material, or any combination thereof in an amount of 0.1% to 8.5% by weight based on the total weight of the granule coating, the granule coating material, or any combination thereof. In some embodiments, the graphene may be present in the granule coating, the granule coating material, or any combination thereof in an amount of 0.1% to 8% by weight based on the total weight of the granule coating, the granule coating material, or any combination thereof. In some embodiments, the graphene may be present in the granule coating, the granule coating material, or any combination thereof in an amount of 0.1% to 7.5% by weight based on the total weight of the granule coating, the granule coating material, or any combination thereof. In some embodiments, the graphene may be present in the granule coating, the granule coating material, or any combination thereof in an amount of 0.1% to 7% by weight based on the total weight of the granule coating, the granule coating material, or any combination thereof. In some embodiments, the graphene may be present in the granule coating, the granule coating material, or any combination thereof in an amount of 0.1% to 6.5% by weight based on the total weight of the granule coating, the granule coating material, or any combination thereof. In some embodiments, the graphene may be present in the granule coating, the granule coating material, or any combination thereof in an amount of 0.1% to 6% by weight based on the total weight of the granule coating, the granule coating material, or any combination thereof. In some embodiments, the graphene may be present in the granule coating, the granule coating material, or any combination thereof in an amount of 0.1% to 5.5% by weight based on the total weight of the granule coating, the granule coating material, or any combination thereof. In some embodiments, the graphene may be present in the granule coating, the granule coating material, or any combination thereof in an amount of 0.1% to 5% by weight based on the total weight of the granule coating, the granule coating material, or any combination thereof. In some embodiments, the graphene may be present in the granule coating, the granule coating material, or any combination thereof in an amount of 0.1% to 4.8% by weight based on the total weight of the granule coating, the granule coating material, or any combination thereof. In some embodiments, the graphene may be present in the granule coating, the granule coating material, or any combination thereof in an amount of 0.1% to 4.6% by weight based on the total weight of the granule coating, the granule coating material, or any combination thereof. In some embodiments, the graphene may be present in the granule coating, the granule coating material, or any combination thereof in an amount of 0.1% to 4.5% by weight based on the total weight of the granule coating, the granule coating material, or any combination thereof. In some embodiments, the graphene may be present in the granule coating, the granule coating material, or any combination thereof in an amount of 0.1% to 4.4% by weight based on the total weight of the granule coating, the granule coating material, or any combination thereof. In some embodiments, the graphene may be present in the granule coating, the granule coating material, or any combination thereof in an amount of 0.1% to 4.2% by weight based on the total weight of the granule coating, the granule coating material, or any combination thereof. In some embodiments, the graphene may be present in the granule coating, the granule coating material, or any combination thereof in an amount of 0.1% to 4% by weight based on the total weight of the granule coating, the granule coating material, or any combination thereof. In some embodiments, the graphene may be present in the granule coating, the granule coating material, or any combination thereof in an amount of 0.1% to 3.8% by weight based on the total weight of the granule coating, the granule coating material, or any combination thereof. In some embodiments, the graphene may be present in the granule coating, the granule coating material, or any combination thereof in an amount of 0.1% to 3.6% by weight based on the total weight of the granule coating, the granule coating material, or any combination thereof. In some embodiments, the graphene may be present in the granule coating, the granule coating material, or any combination thereof in an amount of 0.1% to 3.5% by weight based on the total weight of the granule coating, the granule coating material, or any combination thereof. In some embodiments, the graphene may be present in the granule coating, the granule coating material, or any combination thereof in an amount of 0.1% to 3.4% by weight based on the total weight of the granule coating, the granule coating material, or any combination thereof. In some embodiments, the graphene may be present in the granule coating, the granule coating material, or any combination thereof in an amount of 0.1% to 3.2% by weight based on the total weight of the granule coating, the granule coating material, or any combination thereof. In some embodiments, the graphene may be present in the granule coating, the granule coating material, or any combination thereof in an amount of 0.1% to 3% by weight based on the total weight of the granule coating, the granule coating material, or any combination thereof. In some embodiments, the graphene may be present in the granule coating, the granule coating material, or any combination thereof in an amount of 0.1% to 2.8% by weight based on the total weight of the granule coating, the granule coating material, or any combination thereof. In some embodiments, the graphene may be present in the granule coating, the granule coating material, or any combination thereof in an amount of 0.1% to 2.6% by weight based on the total weight of the granule coating, the granule coating material, or any combination thereof. In some embodiments, the graphene may be present in the granule coating, the granule coating material, or any combination thereof in an amount of 0.1% to 2.5% by weight based on the total weight of the granule coating, the granule coating material, or any combination thereof. In some embodiments, the graphene may be present in the granule coating, the granule coating material, or any combination thereof in an amount of 0.1% to 2.4% by weight based on the total weight of the granule coating, the granule coating material, or any combination thereof. In some embodiments, the graphene may be present in the granule coating, the granule coating material, or any combination thereof in an amount of 0.1% to 2.2% by weight based on the total weight of the granule coating, the granule coating material, or any combination thereof. In some embodiments, the graphene may be present in the granule coating, the granule coating material, or any combination thereof in an amount of 0.1% to 2% by weight based on the total weight of the granule coating, the granule coating material, or any combination thereof. In some embodiments, the graphene may be present in the granule coating, the granule coating material, or any combination thereof in an amount of 0.1% to 1.8% by weight based on the total weight of the granule coating, the granule coating material, or any combination thereof. In some embodiments, the graphene may be present in the granule coating, the granule coating material, or any combination thereof in an amount of 0.1% to 1.6% by weight based on the total weight of the granule coating, the granule coating material, or any combination thereof. In some embodiments, the graphene may be present in the granule coating, the granule coating material, or any combination thereof in an amount of 0.1% to 1.5% by weight based on the total weight of the granule coating, the granule coating material, or any combination thereof. In some embodiments, the graphene may be present in the granule coating, the granule coating material, or any combination thereof in an amount of 0.1% to 1.4% by weight based on the total weight of the granule coating, the granule coating material, or any combination thereof. In some embodiments, the graphene may be present in the granule coating, the granule coating material, or any combination thereof in an amount of 0.1% to 1.2% by weight based on the total weight of the granule coating, the granule coating material, or any combination thereof. In some embodiments, the graphene may be present in the granule coating, the granule coating material, or any combination thereof in an amount of 0.1% to 1% by weight based on the total weight of the granule coating, the granule coating material, or any combination thereof. In some embodiments, the graphene may be present in the granule coating, the granule coating material, or any combination thereof in an amount of 0.1% to 0.8% by weight based on the total weight of the granule coating, the granule coating material, or any combination thereof. In some embodiments, the graphene may be present in the granule coating, the granule coating material, or any combination thereof in an amount of 0.1% to 0.6% by weight based on the total weight of the granule coating, the granule coating material, or any combination thereof. In some embodiments, the graphene may be present in the granule coating, the granule coating material, or any combination thereof in an amount of 0.1% to 0.5% by weight based on the total weight of the granule coating, the granule coating material, or any combination thereof. In some embodiments, the graphene may be present in the granule coating, the granule coating material, or any combination thereof in an amount of 0.1% to 0.4% by weight based on the total weight of the granule coating, the granule coating material, or any combination thereof.

In some embodiments, the graphene may be present in the granule coating, the granule coating material, or any combination thereof in an amount of 0.01% to 20% by weight based on the total weight of the granule coating, the granule coating material, or any combination thereof. In some embodiments, the graphene may be present in the granule coating, the granule coating material, or any combination thereof in an amount of 0.2% to 20% by weight based on the total weight of the granule coating, the granule coating material, or any combination thereof. In some embodiments, the graphene may be present in the granule coating, the granule coating material, or any combination thereof in an amount of 0.4% to 20% by weight based on the total weight of the granule coating, the granule coating material, or any combination thereof. In some embodiments, the graphene may be present in the granule coating, the granule coating material, or any combination thereof in an amount of 0.5% to 20% by weight based on the total weight of the granule coating, the granule coating material, or any combination thereof. In some embodiments, the graphene may be present in the granule coating, the granule coating material, or any combination thereof in an amount of 0.6% to 20% by weight based on the total weight of the granule coating, the granule coating material, or any combination thereof. In some embodiments, the graphene may be present in the granule coating, the granule coating material, or any combination thereof in an amount of 0.8% to 20% by weight based on the total weight of the granule coating, the granule coating material, or any combination thereof. In some embodiments, the graphene may be present in the granule coating, the granule coating material, or any combination thereof in an amount of 1% to 20% by weight based on the total weight of the granule coating, the granule coating material, or any combination thereof. In some embodiments, the graphene may be present in the granule coating, the granule coating material, or any combination thereof in an amount of 1.2% to 20% by weight based on the total weight of the granule coating, the granule coating material, or any combination thereof. In some embodiments, the graphene may be present in the granule coating, the granule coating material, or any combination thereof in an amount of 1.4% to 20% by weight based on the total weight of the granule coating, the granule coating material, or any combination thereof. In some embodiments, the graphene may be present in the granule coating, the granule coating material, or any combination thereof in an amount of 1.5% to 20% by weight based on the total weight of the granule coating, the granule coating material, or any combination thereof. In some embodiments, the graphene may be present in the granule coating, the granule coating material, or any combination thereof in an amount of 1.6% to 20% by weight based on the total weight of the granule coating, the granule coating material, or any combination thereof. In some embodiments, the graphene may be present in the granule coating, the granule coating material, or any combination thereof in an amount of 1.8% to 20% by weight based on the total weight of the granule coating, the granule coating material, or any combination thereof. In some embodiments, the graphene may be present in the granule coating, the granule coating material, or any combination thereof in an amount of 2% to 20% by weight based on the total weight of the granule coating, the granule coating material, or any combination thereof. In some embodiments, the graphene may be present in the granule coating, the granule coating material, or any combination thereof in an amount of 2.2% to 20% by weight based on the total weight of the granule coating, the granule coating material, or any combination thereof. In some embodiments, the graphene may be present in the granule coating, the granule coating material, or any combination thereof in an amount of 2.4% to 20% by weight based on the total weight of the granule coating, the granule coating material, or any combination thereof. In some embodiments, the graphene may be present in the granule coating, the granule coating material, or any combination thereof in an amount of 2.5% to 20% by weight based on the total weight of the granule coating, the granule coating material, or any combination thereof. In some embodiments, the graphene may be present in the granule coating, the granule coating material, or any combination thereof in an amount of 2.6% to 20% by weight based on the total weight of the granule coating, the granule coating material, or any combination thereof. In some embodiments, the graphene may be present in the granule coating, the granule coating material, or any combination thereof in an amount of 2.8% to 20% by weight based on the total weight of the granule coating, the granule coating material, or any combination thereof. In some embodiments, the graphene may be present in the granule coating, the granule coating material, or any combination thereof in an amount of 3% to 20% by weight based on the total weight of the granule coating, the granule coating material, or any combination thereof. In some embodiments, the graphene may be present in the granule coating, the granule coating material, or any combination thereof in an amount of 3.2% to 20% by weight based on the total weight of the granule coating, the granule coating material, or any combination thereof. In some embodiments, the graphene may be present in the granule coating, the granule coating material, or any combination thereof in an amount of 3.4% to 20% by weight based on the total weight of the granule coating, the granule coating material, or any combination thereof. In some embodiments, the graphene may be present in the granule coating, the granule coating material, or any combination thereof in an amount of 3.5% to 20% by weight based on the total weight of the granule coating, the granule coating material, or any combination thereof. In some embodiments, the graphene may be present in the granule coating, the granule coating material, or any combination thereof in an amount of 3.6% to 20% by weight based on the total weight of the granule coating, the granule coating material, or any combination thereof. In some embodiments, the graphene may be present in the granule coating, the granule coating material, or any combination thereof in an amount of 3.8% to 20% by weight based on the total weight of the granule coating, the granule coating material, or any combination thereof. In some embodiments, the graphene may be present in the granule coating, the granule coating material, or any combination thereof in an amount of 4% to 20% by weight based on the total weight of the granule coating, the granule coating material, or any combination thereof. In some embodiments, the graphene may be present in the granule coating, the granule coating material, or any combination thereof in an amount of 4.2% to 20% by weight based on the total weight of the granule coating, the granule coating material, or any combination thereof. In some embodiments, the graphene may be present in the granule coating, the granule coating material, or any combination thereof in an amount of 4.4% to 20% by weight based on the total weight of the granule coating, the granule coating material, or any combination thereof. In some embodiments, the graphene may be present in the granule coating, the granule coating material, or any combination thereof in an amount of 4.5% to 20% by weight based on the total weight of the granule coating, the granule coating material, or any combination thereof. In some embodiments, the graphene may be present in the granule coating, the granule coating material, or any combination thereof in an amount of 4.6% to 20% by weight based on the total weight of the granule coating, the granule coating material, or any combination thereof. In some embodiments, the graphene may be present in the granule coating, the granule coating material, or any combination thereof in an amount of 4.8% to 20% by weight based on the total weight of the granule coating, the granule coating material, or any combination thereof. In some embodiments, the graphene may be present in the granule coating, the granule coating material, or any combination thereof in an amount of 5% to 20% by weight based on the total weight of the granule coating, the granule coating material, or any combination thereof. In some embodiments, the graphene may be present in the granule coating, the granule coating material, or any combination thereof in an amount of 6% to 20% by weight based on the total weight of the granule coating, the granule coating material, or any combination thereof. In some embodiments, the graphene may be present in the granule coating, the granule coating material, or any combination thereof in an amount of 7% to 20% by weight based on the total weight of the granule coating, the granule coating material, or any combination thereof. In some embodiments, the graphene may be present in the granule coating, the granule coating material, or any combination thereof in an amount of 8% to 20% by weight based on the total weight of the granule coating, the granule coating material, or any combination thereof. In some embodiments, the graphene may be present in the granule coating, the granule coating material, or any combination thereof in an amount of 9% to 20% by weight based on the total weight of the granule coating, the granule coating material, or any combination thereof. In some embodiments, the graphene may be present in the granule coating, the granule coating material, or any combination thereof in an amount of 10% to 20% by weight based on the total weight of the granule coating, the granule coating material, or any combination thereof. In some embodiments, the graphene may be present in the granule coating, the granule coating material, or any combination thereof in an amount of 11% to 20% by weight based on the total weight of the granule coating, the granule coating material, or any combination thereof. In some embodiments, the graphene may be present in the granule coating, the granule coating material, or any combination thereof in an amount of 12% to 20% by weight based on the total weight of the granule coating, the granule coating material, or any combination thereof. In some embodiments, the graphene may be present in the granule coating, the granule coating material, or any combination thereof in an amount of 13% to 20% by weight based on the total weight of the granule coating, the granule coating material, or any combination thereof. In some embodiments, the graphene may be present in the granule coating, the granule coating material, or any combination thereof in an amount of 14% to 20% by weight based on the total weight of the granule coating, the granule coating material, or any combination thereof. In some embodiments, the graphene may be present in the granule coating, the granule coating material, or any combination thereof in an amount of 15% to 20% by weight based on the total weight of the granule coating, the granule coating material, or any combination thereof. In some embodiments, the graphene may be present in the granule coating, the granule coating material, or any combination thereof in an amount of 16% to 20% by weight based on the total weight of the granule coating, the granule coating material, or any combination thereof. In some embodiments, the graphene may be present in the granule coating, the granule coating material, or any combination thereof in an amount of 17% to 20% by weight based on the total weight of the granule coating, the granule coating material, or any combination thereof. In some embodiments, the graphene may be present in the granule coating, the granule coating material, or any combination thereof in an amount of 18% to 20% by weight based on the total weight of the granule coating, the granule coating material, or any combination thereof. In some embodiments, the graphene may be present in the granule coating, the granule coating material, or any combination thereof in an amount of 19% to 20% by weight based on the total weight of the granule coating, the granule coating material, or any combination thereof.

In some embodiments, the graphene may be present in the granule coating, the granule coating material, or any combination thereof in an amount of 0.01% to 10% by weight based on the total weight of the granule coating, the granule coating material, or any combination thereof. In some embodiments, the graphene may be present in the granule coating, the granule coating material, or any combination thereof in an amount of 0.2% to 10% by weight based on the total weight of the granule coating, the granule coating material, or any combination thereof. In some embodiments, the graphene may be present in the granule coating, the granule coating material, or any combination thereof in an amount of 0.4% to 10% by weight based on the total weight of the granule coating, the granule coating material, or any combination thereof. In some embodiments, the graphene may be present in the granule coating, the granule coating material, or any combination thereof in an amount of 0.5% to 10% by weight based on the total weight of the granule coating, the granule coating material, or any combination thereof. In some embodiments, the graphene may be present in the granule coating, the granule coating material, or any combination thereof in an amount of 0.6% to 10% by weight based on the total weight of the granule coating, the granule coating material, or any combination thereof. In some embodiments, the graphene may be present in the granule coating, the granule coating material, or any combination thereof in an amount of 0.8% to 10% by weight based on the total weight of the granule coating, the granule coating material, or any combination thereof. In some embodiments, the graphene may be present in the granule coating, the granule coating material, or any combination thereof in an amount of 1% to 10% by weight based on the total weight of the granule coating, the granule coating material, or any combination thereof. In some embodiments, the graphene may be present in the granule coating, the granule coating material, or any combination thereof in an amount of 1.2% to 10% by weight based on the total weight of the granule coating, the granule coating material, or any combination thereof. In some embodiments, the graphene may be present in the granule coating, the granule coating material, or any combination thereof in an amount of 1.4% to 10% by weight based on the total weight of the granule coating, the granule coating material, or any combination thereof. In some embodiments, the graphene may be present in the granule coating, the granule coating material, or any combination thereof in an amount of 1.5% to 10% by weight based on the total weight of the granule coating, the granule coating material, or any combination thereof. In some embodiments, the graphene may be present in the granule coating, the granule coating material, or any combination thereof in an amount of 1.6% to 10% by weight based on the total weight of the granule coating, the granule coating material, or any combination thereof. In some embodiments, the graphene may be present in the granule coating, the granule coating material, or any combination thereof in an amount of 1.8% to 10% by weight based on the total weight of the granule coating, the granule coating material, or any combination thereof. In some embodiments, the graphene may be present in the granule coating, the granule coating material, or any combination thereof in an amount of 2% to 10% by weight based on the total weight of the granule coating, the granule coating material, or any combination thereof. In some embodiments, the graphene may be present in the granule coating, the granule coating material, or any combination thereof in an amount of 2.2% to 10% by weight based on the total weight of the granule coating, the granule coating material, or any combination thereof. In some embodiments, the graphene may be present in the granule coating, the granule coating material, or any combination thereof in an amount of 2.4% to 10% by weight based on the total weight of the granule coating, the granule coating material, or any combination thereof. In some embodiments, the graphene may be present in the granule coating, the granule coating material, or any combination thereof in an amount of 2.5% to 10% by weight based on the total weight of the granule coating, the granule coating material, or any combination thereof. In some embodiments, the graphene may be present in the granule coating, the granule coating material, or any combination thereof in an amount of 2.6% to 10% by weight based on the total weight of the granule coating, the granule coating material, or any combination thereof. In some embodiments, the graphene may be present in the granule coating, the granule coating material, or any combination thereof in an amount of 2.8% to 10% by weight based on the total weight of the granule coating, the granule coating material, or any combination thereof. In some embodiments, the graphene may be present in the granule coating, the granule coating material, or any combination thereof in an amount of 3% to 10% by weight based on the total weight of the granule coating, the granule coating material, or any combination thereof. In some embodiments, the graphene may be present in the granule coating, the granule coating material, or any combination thereof in an amount of 3.2% to 10% by weight based on the total weight of the granule coating, the granule coating material, or any combination thereof. In some embodiments, the graphene may be present in the granule coating, the granule coating material, or any combination thereof in an amount of 3.4% to 10% by weight based on the total weight of the granule coating, the granule coating material, or any combination thereof. In some embodiments, the graphene may be present in the granule coating, the granule coating material, or any combination thereof in an amount of 3.5% to 10% by weight based on the total weight of the granule coating, the granule coating material, or any combination thereof. In some embodiments, the graphene may be present in the granule coating, the granule coating material, or any combination thereof in an amount of 3.6% to 10% by weight based on the total weight of the granule coating, the granule coating material, or any combination thereof. In some embodiments, the graphene may be present in the granule coating, the granule coating material, or any combination thereof in an amount of 3.8% to 10% by weight based on the total weight of the granule coating, the granule coating material, or any combination thereof. In some embodiments, the graphene may be present in the granule coating, the granule coating material, or any combination thereof in an amount of 4% to 10% by weight based on the total weight of the granule coating, the granule coating material, or any combination thereof. In some embodiments, the graphene may be present in the granule coating, the granule coating material, or any combination thereof in an amount of 4.2% to 10% by weight based on the total weight of the granule coating, the granule coating material, or any combination thereof. In some embodiments, the graphene may be present in the granule coating, the granule coating material, or any combination thereof in an amount of 4.4% to 10% by weight based on the total weight of the granule coating, the granule coating material, or any combination thereof. In some embodiments, the graphene may be present in the granule coating, the granule coating material, or any combination thereof in an amount of 4.5% to 10% by weight based on the total weight of the granule coating, the granule coating material, or any combination thereof. In some embodiments, the graphene may be present in the granule coating, the granule coating material, or any combination thereof in an amount of 4.6% to 10% by weight based on the total weight of the granule coating, the granule coating material, or any combination thereof. In some embodiments, the graphene may be present in the granule coating, the granule coating material, or any combination thereof in an amount of 4.8% to 10% by weight based on the total weight of the granule coating, the granule coating material, or any combination thereof. In some embodiments, the graphene may be present in the granule coating, the granule coating material, or any combination thereof in an amount of 5% to 10% by weight based on the total weight of the granule coating, the granule coating material, or any combination thereof. In some embodiments, the graphene may be present in the granule coating, the granule coating material, or any combination thereof in an amount of 5.2% to 10% by weight based on the total weight of the granule coating, the granule coating material, or any combination thereof. In some embodiments, the graphene may be present in the granule coating, the granule coating material, or any combination thereof in an amount of 5.5% to 10% by weight based on the total weight of the granule coating, the granule coating material, or any combination thereof. In some embodiments, the graphene may be present in the granule coating, the granule coating material, or any combination thereof in an amount of 5.8% to 10% by weight based on the total weight of the granule coating, the granule coating material, or any combination thereof. In some embodiments, the graphene may be present in the granule coating, the granule coating material, or any combination thereof in an amount of 6% to 10% by weight based on the total weight of the granule coating, the granule coating material, or any combination thereof. In some embodiments, the graphene may be present in the granule coating, the granule coating material, or any combination thereof in an amount of 6.2% to 10% by weight based on the total weight of the granule coating, the granule coating material, or any combination thereof. In some embodiments, the graphene may be present in the granule coating, the granule coating material, or any combination thereof in an amount of 6.5% to 10% by weight based on the total weight of the granule coating, the granule coating material, or any combination thereof. In some embodiments, the graphene may be present in the granule coating, the granule coating material, or any combination thereof in an amount of 6.8% to 10% by weight based on the total weight of the granule coating, the granule coating material, or any combination thereof. In some embodiments, the graphene may be present in the granule coating, the granule coating material, or any combination thereof in an amount of 7% to 10% by weight based on the total weight of the granule coating, the granule coating material, or any combination thereof. In some embodiments, the graphene may be present in the granule coating, the granule coating material, or any combination thereof in an amount of 7.2% to 10% by weight based on the total weight of the granule coating, the granule coating material, or any combination thereof. In some embodiments, the graphene may be present in the granule coating, the granule coating material, or any combination thereof in an amount of 7.5% to 10% by weight based on the total weight of the granule coating, the granule coating material, or any combination thereof. In some embodiments, the graphene may be present in the granule coating, the granule coating material, or any combination thereof in an amount of 7.8% to 10% by weight based on the total weight of the granule coating, the granule coating material, or any combination thereof. In some embodiments, the graphene may be present in the granule coating, the granule coating material, or any combination thereof in an amount of 8% to 10% by weight based on the total weight of the granule coating, the granule coating material, or any combination thereof.

In some embodiments, the graphene may be present in the granule coating, the granule coating material, or any combination thereof in an amount of 0.1% to 10% by weight based on the total weight of the granule coating, the granule coating material, or any combination thereof. In some embodiments, the graphene may be present in the granule coating, the granule coating material, or any combination thereof in an amount of 0.5% to 9.5% by weight based on the total weight of the granule coating, the granule coating material, or any combination thereof. In some embodiments, the graphene may be present in the granule coating, the granule coating material, or any combination thereof in an amount of 1% to 9% by weight based on the total weight of the granule coating, the granule coating material, or any combination thereof. In some embodiments, the graphene may be present in the granule coating, the granule coating material, or any combination thereof in an amount of 1.5% to 8.5% by weight based on the total weight of the granule coating, the granule coating material, or any combination thereof. In some embodiments, the graphene may be present in the granule coating, the granule coating material, or any combination thereof in an amount of 2% to 8% by weight based on the total weight of the granule coating, the granule coating material, or any combination thereof. In some embodiments, the graphene may be present in the granule coating, the granule coating material, or any combination thereof in an amount of 2.5% to 7.5% by weight based on the total weight of the granule coating, the granule coating material, or any combination thereof. In some embodiments, the graphene may be present in the granule coating, the granule coating material, or any combination thereof in an amount of 3% to 7% by weight based on the total weight of the granule coating, the granule coating material, or any combination thereof. In some embodiments, the graphene may be present in the granule coating, the granule coating material, or any combination thereof in an amount of 3.5% to 6.5% by weight based on the total weight of the granule coating, the granule coating material, or any combination thereof. In some embodiments, the graphene may be present in the granule coating, the granule coating material, or any combination thereof in an amount of 4% to 6% by weight based on the total weight of the granule coating, the granule coating material, or any combination thereof.

In some embodiments, the at least one additive may comprise, consist of, or consist essentially of at least one coating, at least one binder, or any combination thereof. In some embodiments, the at least one additive may comprise, consist of, or consist essentially of at least one of metal silicates binders, phosphate binders, fluoropolymer coatings, acrylic coatings, polyurethane coatings, sol-gel coatings, silica coatings, or any combination thereof. In some embodiments, the at least one additive may comprise, consist of, or consist essentially of at least one of a metal silicate binder, a phosphate binder, a polymeric coating, a fluoropolymer coating, an acrylic coating, a polyurethane coating, a sol-gel coating, a silica coating, or any combination thereof. In some embodiments, the at least one additive may comprise, consist of, or consist essentially of, or may further comprise, consist of, or consist essentially of, at least one of a latent heat reactant, a dispersing agent, a curing agent, an accelerator, a viscosity modifier, a color pigment, or any combination thereof.

In some embodiments, the at least one additive may comprise, consist of, or consist essentially of at least one organic material, at least one inorganic material, at least one organic-inorganic material, or any combinations thereof. In some embodiments, the at least one additive may comprise, consist of, or consist essentially of at least one of water, at least one metal silicate (e.g., at least one alkali metal silicate, at least one alkaline earth metal silicate, or any combination thereof), at least one metal phosphate, at least one polymer, or any combination thereof. In some embodiments, the at least one additive may comprise, consist of, or consist essentially of a sodium silicate, a potassium silicate, an ammonium silicate, a lithium silicate, a magnesium silicate, a calcium silicate, an aluminum silicate, a titanium silicate, a fluorosilane, a siloxane, a polysiloxane, an organopolysiloxane, an organic silicate, a silicone resin, a titanate, a zirconate, an acrylic polymer, a polyester, an amino resin, an epoxy resin, a phenolic, a polyamide, a polyurethane, a urethane, a silicone resin, a vinyl resin, a polyol, a cycloaliphatic epoxide, a polysulfide, a phenoxy, a fluoropolymer resin, an ultraviolet-curable acrylate, an ultraviolet-curable cycloaliphatic epoxides, a polymethacrylate, a poly methyl methacrylate, a copolymer of methyl methacrylate and an alkyl acrylate (e.g., at least one of ethyl acrylate, butyl acrylate, or any combination thereof), a copolymer of acrylate and methacrylate monomers with other monomers (e.g., styrene, etc.), or any combination thereof.

In some embodiments, the sol-gel coating may comprise, consist of, consist essentially of, or may be prepared from, at least one of a tetraethyl orthosilicate and a coupling agent. In some embodiments, the coupling agent may comprise, consist of, or consist essentially of a silicic acid ester coupling agent. In some embodiments, the coupling agent may comprise, consist of, or consist essentially of tetrabutyl orthosilicate, tetramethoxysilane, tetra-n-propoxysilane, oligomeric tetraethoxysilane (available under the SIVENTO trademark from Degussa AG, Frankfurt am Main, Germany), alkylalkoxysilanes (e.g., at least one of methyltrimethoxysilane, methyltriethoxysilane, propyltrimethoxysilane, propyltriethoxysilane, isobutyltrimethoxysilane, isobutyltriethoxysilane, octyltrimethoxysilane, octyltriethoxysilane, hexadecyltrimethoxysilane, phenyl trimethoxysilane, phenyltriethoxysilane, or any combination thereof), haloalkylalkoxysilanes (e.g., tridecafluoro-1,1,2,2-tetrahydrooctyltriethoxysilane, etc.), organofunctional silanes (e.g., at least one of 3-glycidyloxypropyltrimethoxysilane, 3-glycidyloxypropyltriethoxysilane, 3-methyacryloxypropyltrimethoxysilane, vinyltrimethoxysilane, vinyltriethoxysilane, 3-mercaptopropyltrimethoxysilane, 3-mercaptopropyltriethoxysilane, or any combination thereof), aminofunctional alkoxysilanes (e.g., at least one of 3-aminopropyltriethoxysilane, 3-aminopropyltrimethoxysilane, 2-aminoethyl-3-aminopropyltrimethoxysilane, triaminofunctional propyltrimethoxysilane, N-(n-butyl)-3-aminopropyltrimethoxysilane, 3-aminopropylmethydiethoxysilane, or any combination thereof), or any combination thereof. In some embodiments, the sol-gel coating may be prepared by at least one of the following: preparing a sol comprising at least one of a silane coupling agent and at least one alcohol (e.g., ethanol, isopropanol, methoxypropanol, or any combination thereof); hydrolyzing by addition of a water acidified with hydrochloric acid or sulfuric acid; and curing to form a sol-gel coating.

Some examples of commercially available materials suitable for use as the at least one additive include, without limitation, the ACRYSHIELD® line of acrylic products from National Coatings Corporation (Camarillo, Calif.), QW77 urethane product available from Henkel Corporation (Dusseldorf, Germany), water-based polyurethanes available from Minwax Company (Upper Saddle River, N.J.), the SITREN® line of products (e.g., Sitren 270 and 595) available from Evonik Corporation (Essen, Germany), the SILRES® line of products (e.g., Silres BS1011A and B1 BS3003) available from Wacker Chemie AG (Munich, Germany), the TEGO® line of products (e.g., Tego XP 5000) available from Evonik Corporation (Essen, Germany), the DYNASYLAN® line of silanes and siloxanes (e.g., DYNASYLAN® SIVO 112, DYNASYLAN® F 8815 and DYNASYLAN® VPS SIVO 608) available from Evonik Industries AG (Essen, Germany), the KYNAR® line of products (e.g., Kynar RC-10 and 147) available from Arkema (Colombes, France), the RHOPLEX® line of products (e.g., Rhoplex EC 2540) available from The Dow Chemical Company (Midland, Mich.), the SYCOAT® line of products (e.g., Sycoat 235) available from STI Polymer, Inc. (Sanford, N.C.), the SILRES® line of silanes or siloxanes (e.g., the SILRES® BS line of products, for example SILRES® BS 3003, BS-68, BS-60, BS-33A) available from Wacker Chemie AG (Munich, Germany), the DYNASYLAN® line of silanes and siloxanes (e.g., DYNASYLAN® SIVO 112, DYNASYLAN® F 8815 and DYNASYLAN® VPS SIVO 608) available from Evonik Industries AG (Essen, Germany), and the SILQUEST® line of silanes and siloxanes (e.g., SILQUEST® A-1120, SILQUEST® A-1630A and SILQUEST® A-137) available from Momentive Performance Materials, Inc. (Waterford, N.Y.). Any one or more of the foregoing may be used as the at least one additive, either alone or in combination.

In some embodiments, the at least one additive may comprise, consist of, or consist essentially of or may further comprise, consist of, or consist essentially of at least one of a latent heat reactant, a dispersing agent, a curing agent (e.g., a suitable crosslinker), an accelerator, a viscosity modifier, a color pigment, or any combination thereof. In some embodiments, the latent heat reactant may comprise, consist of, or consist essentially of at least one of a Portland cement, an aluminum fluoride, an ammonium silicofluoride, an alkali metal silicofluoride, an alkaline earth metal silicofluoride, or any combination thereof. In some embodiments, the dispersing agent may comprise, consist of, or consist essentially of at least one of isopropyl alcohol, sodium dodecylbenzenesulfonate, sodium dodecylsulfonate, polyvinylpyrrolidone, sodium cholate, polystyrene, polyvinyl alcohol, or any combination thereof. In some embodiments, the viscosity modifier may comprise, consist of, or consist essentially of at least one of hydroxyl ethyl cellulose (HEC), polyacrylamide (PAA), a rheology modifier, a cellulosic, an acrylic, an associated thickener, a clay, an organoclay, a hydrogenated caster oil, a polyamides, an overbased sulphonate, or any combination thereof. In some embodiments, the color pigment may comprise, consist of, or consist essentially of at least one of a mixed metal oxide pigment, a pearlescent pigment, a metal-coated flake, a metal oxide coated plate-like pigment, a mica, a metallic flake, an infrared-reflective pigment, a metallic powder, or any combination thereof.

In some embodiments, the at least one additive may be present in the granule coating, the granule coating material, or any combination thereof in an amount of 0.999% to 80% by weight based on the total weight of the granule coating, the granule coating material, or any combination thereof. In some embodiments, the at least one additive may be present in the granule coating, the granule coating material, or any combination thereof in an amount of 1% to 80% by weight based on the total weight of the granule coating, the granule coating material, or any combination thereof. In some embodiments, the at least one additive may be present in the granule coating, the granule coating material, or any combination thereof in an amount of 5% to 80% by weight based on the total weight of the granule coating, the granule coating material, or any combination thereof. In some embodiments, the at least one additive may be present in the granule coating, the granule coating material, or any combination thereof in an amount of 10% to 80% by weight based on the total weight of the granule coating, the granule coating material, or any combination thereof. In some embodiments, the at least one additive may be present in the granule coating, the granule coating material, or any combination thereof in an amount of 15% to 80% by weight based on the total weight of the granule coating, the granule coating material, or any combination thereof. In some embodiments, the at least one additive may be present in the granule coating, the granule coating material, or any combination thereof in an amount of 20% to 80% by weight based on the total weight of the granule coating, the granule coating material, or any combination thereof. In some embodiments, the at least one additive may be present in the granule coating, the granule coating material, or any combination thereof in an amount of 25% to 80% by weight based on the total weight of the granule coating, the granule coating material, or any combination thereof. In some embodiments, the at least one additive may be present in the granule coating, the granule coating material, or any combination thereof in an amount of 30% to 80% by weight based on the total weight of the granule coating, the granule coating material, or any combination thereof. In some embodiments, the at least one additive may be present in the granule coating, the granule coating material, or any combination thereof in an amount of 35% to 80% by weight based on the total weight of the granule coating, the granule coating material, or any combination thereof. In some embodiments, the at least one additive may be present in the granule coating, the granule coating material, or any combination thereof in an amount of 40% to 80% by weight based on the total weight of the granule coating, the granule coating material, or any combination thereof. In some embodiments, the at least one additive may be present in the granule coating, the granule coating material, or any combination thereof in an amount of 45% to 80% by weight based on the total weight of the granule coating, the granule coating material, or any combination thereof. In some embodiments, the at least one additive may be present in the granule coating, the granule coating material, or any combination thereof in an amount of 50% to 80% by weight based on the total weight of the granule coating, the granule coating material, or any combination thereof. In some embodiments, the at least one additive may be present in the granule coating, the granule coating material, or any combination thereof in an amount of 55% to 80% by weight based on the total weight of the granule coating, the granule coating material, or any combination thereof. In some embodiments, the at least one additive may be present in the granule coating, the granule coating material, or any combination thereof in an amount of 60% to 80% by weight based on the total weight of the granule coating, the granule coating material, or any combination thereof. In some embodiments, the at least one additive may be present in the granule coating, the granule coating material, or any combination thereof in an amount of 65% to 80% by weight based on the total weight of the granule coating, the granule coating material, or any combination thereof. In some embodiments, the at least one additive may be present in the granule coating, the granule coating material, or any combination thereof in an amount of 70% to 80% by weight based on the total weight of the granule coating, the granule coating material, or any combination thereof. In some embodiments, the at least one additive may be present in the granule coating, the granule coating material, or any combination thereof in an amount of 75% to 80% by weight based on the total weight of the granule coating, the granule coating material, or any combination thereof. The weight percentages provided above for the at least one additive shall be understood to apply independently to each of the additives present in the granule coating, the granule coating material, or any combination thereof, as well as to apply to all additives (e.g., the additives collectively as a whole) present in the granule coating, the granule coating material, or any combination thereof.

In some embodiments, the at least one additive may be present in the granule coating, the granule coating material, or any combination thereof in an amount of 1% to 75% by weight based on the total weight of the granule coating, the granule coating material, or any combination thereof. In some embodiments, the at least one additive may be present in the granule coating, the granule coating material, or any combination thereof in an amount of 1% to 70% by weight based on the total weight of the granule coating, the granule coating material, or any combination thereof. In some embodiments, the at least one additive may be present in the granule coating, the granule coating material, or any combination thereof in an amount of 1% to 65% by weight based on the total weight of the granule coating, the granule coating material, or any combination thereof. In some embodiments, the at least one additive may be present in the granule coating, the granule coating material, or any combination thereof in an amount of 1% to 60% by weight based on the total weight of the granule coating, the granule coating material, or any combination thereof. In some embodiments, the at least one additive may be present in the granule coating, the granule coating material, or any combination thereof in an amount of 1% to 55% by weight based on the total weight of the granule coating, the granule coating material, or any combination thereof. In some embodiments, the at least one additive may be present in the granule coating, the granule coating material, or any combination thereof in an amount of 1% to 50% by weight based on the total weight of the granule coating, the granule coating material, or any combination thereof. In some embodiments, the at least one additive may be present in the granule coating, the granule coating material, or any combination thereof in an amount of 1% to 45% by weight based on the total weight of the granule coating, the granule coating material, or any combination thereof. In some embodiments, the at least one additive may be present in the granule coating, the granule coating material, or any combination thereof in an amount of 1% to 40% by weight based on the total weight of the granule coating, the granule coating material, or any combination thereof. In some embodiments, the at least one additive may be present in the granule coating, the granule coating material, or any combination thereof in an amount of 1% to 35% by weight based on the total weight of the granule coating, the granule coating material, or any combination thereof. In some embodiments, the at least one additive may be present in the granule coating, the granule coating material, or any combination thereof in an amount of 1% to 30% by weight based on the total weight of the granule coating, the granule coating material, or any combination thereof. In some embodiments, the at least one additive may be present in the granule coating, the granule coating material, or any combination thereof in an amount of 1% to 25% by weight based on the total weight of the granule coating, the granule coating material, or any combination thereof. In some embodiments, the at least one additive may be present in the granule coating, the granule coating material, or any combination thereof in an amount of 1% to 20% by weight based on the total weight of the granule coating, the granule coating material, or any combination thereof. In some embodiments, the at least one additive may be present in the granule coating, the granule coating material, or any combination thereof in an amount of 1% to 15% by weight based on the total weight of the granule coating, the granule coating material, or any combination thereof. In some embodiments, the at least one additive may be present in the granule coating, the granule coating material, or any combination thereof in an amount of 1% to 10% by weight based on the total weight of the granule coating, the granule coating material, or any combination thereof. In some embodiments, the at least one additive may be present in the granule coating, the granule coating material, or any combination thereof in an amount of 1% to 5% by weight based on the total weight of the granule coating, the granule coating material, or any combination thereof. The weight percentages provided above for the at least one additive shall be understood to apply independently to each of the additives present in the granule coating, the granule coating material, or any combination thereof, as well as to apply to all additives (e.g., the additives collectively as a whole) present in the granule coating, the granule coating material, or any combination thereof.

As used herein, the term "cover" may be used to describe a surface coverage of at least one material over any portion of a surface. The at least one material may be in direct contact with the surface, in indirect contact with the surface (e.g., a second material may be disposed between the surface and the material covering the surface), or any combination thereof. In some embodiments, the surface coverage of a material, such as graphene, is measured by image analysis.

In some embodiments, the granule coating may cover 1% to 100% of the outer surface of the roofing granule. In some embodiments, the granule coating may cover at least 95% of the outer surface of the roofing granule. In some embodiments, the granule coating may cover at least 90% of the outer surface of the roofing granule. In some embodiments, the granule coating may cover at least 85% of the outer surface of the roofing granule. In some embodiments, the granule coating may cover at least 80% of the outer surface of the roofing granule. In some embodiments, the granule coating may cover at least 75% of the outer surface of the roofing granule. In some embodiments, the granule coating may cover at least 70% of the outer surface of the roofing granule. In some embodiments, the granule coating may cover at least 65% of the outer surface of the roofing granule. In some embodiments, the granule coating may cover at least 60% of the outer surface of the roofing granule. In some embodiments, the granule coating may cover at least 55% of the outer surface of the roofing granule. In some embodiments, the granule coating may cover at least 50% of the outer surface of the roofing granule. In some embodiments, the granule coating may cover at least 45% of the outer surface of the roofing granule. In some embodiments, the granule coating may cover at least 40% of the outer surface of the roofing granule. In some embodiments, the granule coating may cover at least 35% of the outer surface of the roofing granule. In some embodiments, the granule coating may cover at least 30% of the outer surface of the roofing granule. In some embodiments, the granule coating may cover at least 25% of the outer surface of the roofing granule. In some embodiments, the granule coating may cover at least 20% of the outer surface of the roofing granule. In some embodiments, the granule coating may cover at least 15% of the outer surface of the roofing granule. In some embodiments, the granule coating may cover at least 10% of the outer surface of the roofing granule. In some embodiments, the granule coating may cover at least 5% of the outer surface of the roofing granule. In some embodiments, the granule coating may cover at least 1% of the outer surface of the roofing granule.

In some embodiments, the granule coating may cover 10% to 100% of the outer surface of the roofing granule. In some embodiments, the granule coating may cover 20% to 100% of the outer surface of the roofing granule. In some embodiments, the granule coating may cover 30% to 100% of the outer surface of the roofing granule. In some embodiments, the granule coating may cover 40% to 100% of the outer surface of the roofing granule. In some embodiments, the granule coating may cover 50% to 100% of the outer surface of the roofing granule. In some embodiments, the granule coating may cover 55% to 100% of the outer surface of the roofing granule. In some embodiments, the granule coating may cover 60% to 100% of the outer surface of the roofing granule. In some embodiments, the granule coating may cover 65% to 100% of the outer surface of the roofing granule. In some embodiments, the granule coating may cover 70% to 100% of the outer surface of the roofing granule. In some embodiments, the granule coating may cover 75% to 100% of the outer surface of the roofing granule. In some embodiments, the granule coating may cover 80% to 100% of the outer surface of the roofing granule. In some embodiments, the granule coating may cover 85% to 100% of the outer surface of the roofing granule. In some embodiments, the granule coating may cover 90% to 100% of the outer surface of the roofing granule. In some embodiments, the granule coating may cover 95% to 100% of the outer surface of the roofing granule. In some embodiments, the granule coating may cover 50% to 95% of the outer surface of the roofing granule. In some embodiments, the granule coating may cover 50% to 90% of the outer surface of the roofing granule. In some embodiments, the granule coating may cover 50% to 85% of the outer surface of the roofing granule. In some embodiments, the granule coating may cover 50% to 80% of the outer surface of the roofing granule. In some embodiments, the granule coating may cover 50% to 75% of the outer surface of the roofing granule. In some embodiments, the granule coating may cover 50% to 70% of the outer surface of the roofing granule. In some embodiments, the granule coating may cover 50% to 65% of the outer surface of the roofing granule. In some embodiments, the granule coating may cover 50% to 60% of the outer surface of the roofing granule. In some embodiments, the granule coating may cover 50% to 55% of the outer surface of the roofing granule. In some embodiments, the granule coating may cover 25% to 100% of the outer surface of the roofing granule. In some embodiments, the granule coating may cover 25% to 99% of the outer surface of the roofing granule. In some embodiments, the granule coating may cover 25% to 95% of the outer surface of the roofing granule. In some embodiments, the granule coating may cover 25% to 90% of the outer surface of the roofing granule. In some embodiments, the granule coating may cover 25% to 85% of the outer surface of the roofing granule. In some embodiments, the granule coating may cover 25% to 80% of the outer surface of the roofing granule. In some embodiments, the granule coating may cover 25% to 75% of the outer surface of the roofing granule. In some embodiments, the granule coating may cover 25% to 70% of the outer surface of the roofing granule. In some embodiments, the granule coating may cover 25% to 65% of the outer surface of the roofing granule. In some embodiments, the granule coating may cover 25% to 60% of the outer surface of the roofing granule. In some embodiments, the granule coating may cover 25% to 55% of the outer surface of the roofing granule. In some embodiments, the granule coating may cover 25% to 50% of the outer surface of the roofing granule.

In some embodiments, the granule coating may cover 1% to 100% of the outer surface of the reflective base coating. In some embodiments, the granule coating may cover at least 95% of the outer surface of the reflective base coating. In some embodiments, the granule coating may cover at least 90% of the outer surface of the reflective base coating. In some embodiments, the granule coating may cover at least 85% of the outer surface of the reflective base coating. In some embodiments, the granule coating may cover at least 80% of the outer surface of the reflective base coating. In some embodiments, the granule coating may cover at least 75% of the outer surface of the reflective base coating. In some embodiments, the granule coating may cover at least 70% of the outer surface of the reflective base coating. In some embodiments, the granule coating may cover at least 65% of the outer surface of the reflective base coating. In some embodiments, the granule coating may cover at least 60% of the outer surface of the reflective base coating. In some embodiments, the granule coating may cover at least 55% of the outer surface of the reflective base coating. In some embodiments, the granule coating may cover at least 50% of the outer surface of the reflective base coating. In some embodiments, the granule coating may cover at least 45% of the outer surface of the reflective base coating. In some embodiments, the granule coating may cover at least 40% of the outer surface of the reflective base coating. In some embodiments, the granule coating may cover at least 35% of the outer surface of the reflective base coating. In some embodiments, the granule coating may cover at least 30% of the outer surface of the reflective base coating. In some embodiments, the granule coating may cover at least 25% of the outer surface of the reflective base coating. In some embodiments, the granule coating may cover at least 20% of the outer surface of the reflective base coating. In some embodiments, the granule coating may cover at least 15% of the outer surface of the reflective base coating. In some embodiments, the granule coating may cover at least 10% of the outer surface of the reflective base coating. In some embodiments, the granule coating may cover at least 5% of the outer surface of the reflective base coating. In some embodiments, the granule coating may cover at least 1% of the outer surface of the reflective base coating.

In some embodiments, the granule coating may cover 10% to 100% of the outer surface of the reflective base coating. In some embodiments, the granule coating may cover 20% to 100% of the outer surface of the reflective base coating. In some embodiments, the granule coating may cover 30% to 100% of the outer surface of the reflective base coating. In some embodiments, the granule coating may cover 40% to 100% of the outer surface of the reflective base coating. In some embodiments, the granule coating may cover 50% to 100% of the outer surface of the reflective base coating. In some embodiments, the granule coating may cover 55% to 100% of the outer surface of the reflective base coating. In some embodiments, the granule coating may cover 60% to 100% of the outer surface of the reflective base coating. In some embodiments, the granule coating may cover 65% to 100% of the outer surface of the reflective base coating. In some embodiments, the granule coating may cover 70% to 100% of the outer surface of the reflective base coating. In some embodiments, the granule coating may cover 75% to 100% of the outer surface of the reflective base coating. In some embodiments, the granule coating may cover 80% to 100% of the outer surface of the reflective base coating. In some embodiments, the granule coating may cover 85% to 100% of the outer surface of the reflective base coating. In some embodiments, the granule coating may cover 90% to 100% of the outer surface of the reflective base coating. In some embodiments, the granule coating may cover 95% to 100% of the outer surface of the reflective base coating. In some embodiments, the granule coating may cover 50% to 95% of the outer surface of the reflective base coating. In some embodiments, the granule coating may cover 50% to 90% of the outer surface of the reflective base coating. In some embodiments, the granule coating may cover 50% to 85% of the outer surface of the reflective base coating. In some embodiments, the granule coating may cover 50% to 80% of the outer surface of the reflective base coating. In some embodiments, the granule coating may cover 50% to 75% of the outer surface of the reflective base coating. In some embodiments, the granule coating may cover 50% to 70% of the outer surface of the reflective base coating. In some embodiments, the granule coating may cover 50% to 65% of the outer surface of the reflective base coating. In some embodiments, the granule coating may cover 50% to 60% of the outer surface of the reflective base coating. In some embodiments, the granule coating may cover 50% to 55% of the outer surface of the reflective base coating. In some embodiments, the granule coating may cover 25% to 99% of the outer surface of the reflective base coating. In some embodiments, the granule coating may cover 25% to 95% of the outer surface of the reflective base coating. In some embodiments, the granule coating may cover 25% to 90% of the outer surface of the reflective base coating. In some embodiments, the granule coating may cover 25% to 85% of the outer surface of the reflective base coating. In some embodiments, the granule coating may cover 25% to 80% of the outer surface of the reflective base coating. In some embodiments, the granule coating may cover 25% to 75% of the outer surface of the reflective base coating. In some embodiments, the granule coating may cover 25% to 70% of the outer surface of the reflective base coating. In some embodiments, the granule coating may cover 25% to 65% of the outer surface of the reflective base coating. In some embodiments, the granule coating may cover 25% to 60% of the outer surface of the reflective base coating. In some embodiments, the granule coating may cover 25% to 55% of the outer surface of the reflective base coating. In some embodiments, the granule coating may cover 25% to 50% of the outer surface of the reflective base coating.

In some embodiments, the granule coating may have a thickness of 100 mil or less. In some embodiments, the granule coating may have a thickness of 75 mil or less. In some embodiments, the granule coating may have a thickness of 50 mil or less. In some embodiments, the granule coating may have a thickness of 45 mil or less. In some embodiments, the granule coating may have a thickness of 40 mil or less. In some embodiments, the granule coating may have a thickness of 35 mil or less. In some embodiments, the granule coating may have a thickness of 30 mil or less. In some embodiments, the granule coating may have a thickness of 25 mil or less. In some embodiments, the granule coating may have a thickness of 24 mil or less. In some embodiments, the granule coating may have a thickness of 22 mil or less. In some embodiments, the granule coating may have a thickness of 20 mil or less. In some embodiments, the granule coating may have a thickness of 18 mil or less. In some embodiments, the granule coating may have a thickness of 16 mil or less. In some embodiments, the granule coating may have a thickness of 15 mil or less. In some embodiments, the granule coating may have a thickness of 14 mil or less. In some embodiments, the granule coating may have a thickness of 12 mil or less. In some embodiments, the granule coating may have a thickness of 10 mil or less. In some embodiments, the granule coating may have a thickness of 8 mil or less. In some embodiments, the granule coating may have a thickness of 6 mil or less. In some embodiments, the granule coating may have a thickness of 5 mil or less.

In some embodiments, the granule coating may have a thickness of 0.01 mil to 75 mil. In some embodiments, the granule coating may have a thickness of 0.1 mil to 50 mil. In some embodiments, the granule coating may have a thickness of 0.1 mil to 45 mil. In some embodiments, the granule coating may have a thickness of 0.1 mil to 40 mil. In some embodiments, the granule coating may have a thickness of 0.1 mil to 35 mil. In some embodiments, the granule coating may have a thickness of 0.1 mil to 30 mil. In some embodiments, the granule coating may have a thickness of 0.1 mil to 25 mil. In some embodiments, the granule coating may have a thickness of 0.1 mil to 24 mil. In some embodiments, the granule coating may have a thickness of 0.1 mil to 22 mil. In some embodiments, the granule coating may have a thickness of 0.1 mil to 20 mil. In some embodiments, the granule coating may have a thickness of 0.1 mil to 18 mil. In some embodiments, the granule coating may have a thickness of 0.1 mil to 16 mil. In some embodiments, the granule coating may have a thickness of 0.1 mil to 15 mil. In some embodiments, the granule coating may have a thickness of 0.1 mil to 14 mil. In some embodiments, the granule coating may have a thickness of 0.1 mil to 12 mil. In some embodiments, the granule coating may have a thickness of 0.1 mil to 10 mil. In some embodiments, the granule coating may have a thickness of 0.1 mil to 8 mil. In some embodiments, the granule coating may have a thickness of 0.1 mil to 6 mil. In some embodiments, the granule coating may have a thickness of 0.1 mil to 5 mil.

In some embodiments, the granule coating may have a thickness of 1 mil to 50 mil. In some embodiments, the granule coating may have a thickness of 5 mil to 50 mil. In some embodiments, the granule coating may have a thickness of 6 mil to 50 mil. In some embodiments, the granule coating may have a thickness of 8 mil to 50 mil. In some embodiments, the granule coating may have a thickness of 10 mil to 50 mil. In some embodiments, the granule coating may have a thickness of 12 mil to 50 mil. In some embodiments, the granule coating may have a thickness of 14 mil to 50 mil. In some embodiments, the granule coating may have a thickness of 15 mil to 50 mil. In some embodiments, the granule coating may have a thickness of 16 mil to 50 mil. In some embodiments, the granule coating may have a thickness of 18 mil to 50 mil. In some embodiments, the granule coating may have a thickness of 20 mil to 50 mil. In some embodiments, the granule coating may have a thickness of 22 mil to 50 mil. In some embodiments, the granule coating may have a thickness of 24 mil to 50 mil. In some embodiments, the granule coating may have a thickness of 25 mil to 50 mil. In some embodiments, the granule coating may have a thickness of 30 mil to 50 mil. In some embodiments, the granule coating may have a thickness of 35 mil to 50 mil. In some embodiments, the granule coating may have a thickness of 40 mil to 50 mil. In some embodiments, the granule coating may have a thickness of 45 mil to 50 mil.

In some embodiments, the granule coating may have a thickness of 1 mil to 25 mil. In some embodiments, the granule coating may have a thickness of 2 mil to 25 mil. In some embodiments, the granule coating may have a thickness of 4 mil to 25 mil. In some embodiments, the granule coating may have a thickness of 5 mil to 25 mil. In some embodiments, the granule coating may have a thickness of 6 mil to 25 mil. In some embodiments, the granule coating may have a thickness of 8 mil to 25 mil. In some embodiments, the granule coating may have a thickness of 10 mil to 25 mil. In some embodiments, the granule coating may have a thickness of 12 mil to 25 mil. In some embodiments, the granule coating may have a thickness of 14 mil to 25 mil. In some embodiments, the granule coating may have a thickness of 15 mil to 25 mil. In some embodiments, the granule coating may have a thickness of 16 mil to 25 mil. In some embodiments, the granule coating may have a thickness of 18 mil to 25 mil. In some embodiments, the granule coating may have a thickness of 20 mil to 25 mil. In some embodiments, the granule coating may have a thickness of 22 mil to 25 mil.

In some embodiments, the granule coating having a thickness of 10 nm to 800 µm. In some embodiments, the granule coating having a thickness of 10 nm to 700 µm. In some embodiments, the granule coating having a thickness of 10 nm to 600 µm. In some embodiments, the granule coating having a thickness of 10 nm to 500 µm. In some embodiments, the granule coating having a thickness of 10 nm to 400 µm. In some embodiments, the granule coating having a thickness of 10 nm to 300 µm. In some embodiments, the granule coating having a thickness of 10 nm to 200 µm. In some embodiments, the granule coating having a thickness of 10 nm to 100 µm. In some embodiments, the granule coating having a thickness of 10 nm to 1 µm. In some embodiments, the granule coating having a thickness of 10 nm to 900 nm. In some embodiments, the granule coating having a thickness of 10 nm to 800 nm. In some embodiments, the granule coating having a thickness of 10 nm to 700 nm. In some embodiments, the granule coating having a thickness of 10 nm to 600 nm. In some embodiments, the granule coating having a thickness of 10 nm to 500 nm. In some embodiments, the granule coating having a thickness of 10 nm to 400 nm. In some embodiments, the granule coating having a thickness of 10 nm to 300 nm. In some embodiments, the granule coating having a thickness of 10 nm to 200 nm. In some embodiments, the granule coating having a thickness of 10 nm to 100 nm. In some embodiments, the thickness of the granule coating is a thickness of the granule coating on a surface.

In some embodiments, the granule coating having a thickness of 100 nm to 800 µm. In some embodiments, the granule coating having a thickness of 200 nm to 800 µm. In some embodiments, the granule coating having a thickness of 300 nm to 800 µm. In some embodiments, the granule coating having a thickness of 400 nm to 800 µm. In some embodiments, the granule coating having a thickness of 500 nm to 800 µm. In some embodiments, the granule coating having a thickness of 600 nm to 800 µm. In some embodiments, the granule coating having a thickness of 700 nm to 800 µm. In some embodiments, the granule coating having a thickness of 800 nm to 800 µm. In some embodiments, the granule coating having a thickness of 900 nm to 800 µm. In some embodiments, the granule coating having a thickness of 1 µm to 800 µm. In some embodiments, the granule coating having a thickness of 100 µm to 800 µm. In some embodiments, the granule coating having a thickness of 200 µm to 800 µm. In some embodiments, the granule coating having a thickness of 300 µm to 800 µm. In some embodiments, the granule coating having a thickness of 400 µm to 800 µm. In some embodiments, the granule coating having a thickness of 500 µm to 800 µm. In some embodiments, the granule coating having a thickness of 600 µm to 800 µm. In some embodiments, the granule coating having a thickness of 700 µm to 800 µm. In some embodiments, the thickness of the granule coating is a thickness of the granule coating on a surface.

In some embodiments, the graphene is not present in the granule coating. That is, in some embodiments, the graphene is disposed at least on a portion of an outer surface of the granule coating. For example, in some embodiments, a plurality of graphene particles is disposed on at least a portion of an outer surface of the granule coating.

In some embodiments, the plurality of graphene particles may cover 1% to 100% of the outer surface of the roofing granule. In some embodiments, the plurality of graphene particles may cover at least 95% of the outer surface of the roofing granule. In some embodiments, the plurality of graphene particles may cover at least 90% of the outer surface of the roofing granule. In some embodiments, the plurality of graphene particles may cover at least 85% of the outer surface of the roofing granule. In some embodiments, the plurality of graphene particles may cover at least 80% of the outer surface of the roofing granule. In some embodiments, the plurality of graphene particles may cover at least 75% of the outer surface of the roofing granule. In some embodiments, the plurality of graphene particles may cover at least 70% of the outer surface of the roofing granule. In some embodiments, the plurality of graphene particles may cover at least 65% of the outer surface of the roofing granule. In some embodiments, the plurality of graphene particles may cover at least 60% of the outer surface of the roofing granule. In some embodiments, the plurality of graphene particles may cover at least 55% of the outer surface of the roofing granule. In some embodiments, the plurality of graphene particles may cover at least 50% of the outer surface of the roofing granule. In some embodiments, the plurality of graphene particles may cover at least 45% of the outer surface of the roofing granule. In some embodiments, the plurality of graphene particles may cover at least 40% of the outer surface of the roofing granule. In some embodiments, the plurality of graphene particles may cover at least 35% of the outer surface of the roofing granule. In some embodiments, the plurality of graphene particles may cover at least 30% of the outer surface of the roofing granule. In some embodiments, the plurality of graphene particles may cover at least 25% of the outer surface of the roofing granule. In some embodiments, the plurality of graphene particles may cover at least 20% of the outer surface of the roofing granule. In some embodiments, the plurality of graphene particles may cover at least 15% of the outer surface of the roofing granule. In some embodiments, the plurality of graphene particles may cover at least 10% of the outer surface of the roofing granule. In some embodiments, the plurality of graphene particles may cover at least 5% of the outer surface of the roofing granule. In some embodiments, the plurality of graphene particles may cover at least 1% of the outer surface of the roofing granule.

In some embodiments, the plurality of graphene particles may cover 10% to 100% of the outer surface of the roofing granule. In some embodiments, the plurality of graphene particles may cover 20% to 100% of the outer surface of the roofing granule. In some embodiments, the plurality of graphene particles may cover 30% to 100% of the outer surface of the roofing granule. In some embodiments, the plurality of graphene particles may cover 40% to 100% of the outer surface of the roofing granule. In some embodiments, the plurality of graphene particles may cover 50% to 100% of the outer surface of the roofing granule. In some embodiments, the plurality of graphene particles may cover 55% to 100% of the outer surface of the roofing granule. In some embodiments, the plurality of graphene particles may cover 60% to 100% of the outer surface of the roofing granule. In some embodiments, the plurality of graphene particles may cover 65% to 100% of the outer surface of the roofing granule. In some embodiments, the plurality of graphene particles may cover 70% to 100% of the outer surface of the roofing granule. In some embodiments, the plurality of graphene particles may cover 75% to 100% of the outer surface of the roofing granule. In some embodiments, the plurality of graphene particles may cover 80% to 100% of the outer surface of the roofing granule. In some embodiments, the plurality of graphene particles may cover 85% to 100% of the outer surface of the roofing granule. In some embodiments, the plurality of graphene particles may cover 90% to 100% of the outer surface of the roofing granule. In some embodiments, the plurality of graphene particles may cover 95% to 100% of the outer surface of the roofing granule. In some embodiments, the plurality of graphene particles may cover 50% to 95% of the outer surface of the roofing granule. In some embodiments, the plurality of graphene particles may cover 50% to 90% of the outer surface of the roofing granule. In some embodiments, the plurality of graphene particles may cover 50% to 85% of the outer surface of the roofing granule. In some embodiments, the plurality of graphene particles may cover 50% to 80% of the outer surface of the roofing granule. In some embodiments, the plurality of graphene particles may cover 50% to 75% of the outer surface of the roofing granule. In some embodiments, the plurality of graphene particles may cover 50% to 70% of the outer surface of the roofing granule. In some embodiments, the plurality of graphene particles may cover 50% to 65% of the outer surface of the roofing granule. In some embodiments, the plurality of graphene particles may cover 50% to 60% of the outer surface of the roofing granule. In some embodiments, the plurality of graphene particles may cover 50% to 55% of the outer surface of the roofing granule. In some embodiments, the plurality of graphene particles may cover 25% to 99% of the outer surface of the roofing granule. In some embodiments, the plurality of graphene particles may cover 25% to 95% of the outer surface of the roofing granule. In some embodiments, the plurality of graphene particles may cover 25% to 90% of the outer surface of the roofing granule. In some embodiments, the plurality of graphene particles may cover 25% to 85% of the outer surface of the roofing granule. In some embodiments, the plurality of graphene particles may cover 25% to 80% of the outer surface of the roofing granule. In some embodiments, the plurality of graphene particles may cover 25% to 75% of the outer surface of the roofing granule. In some embodiments, the plurality of graphene particles may cover 25% to 70% of the outer surface of the roofing granule. In some embodiments, the plurality of graphene particles may cover 25% to 65% of the outer surface of the roofing granule. In some embodiments, the plurality of graphene particles may cover 25% to 60% of the outer surface of the roofing granule. In some embodiments, the plurality of graphene particles may cover 25% to 55% of the outer surface of the roofing granule. In some embodiments, the plurality of graphene particles may cover 25% to 50% of the outer surface of the roofing granule.

In some embodiments, the plurality of graphene particles may cover 1% to 100% of the outer surface of the granule coating. In some embodiments, the plurality of graphene particles may cover at least 95% of the outer surface of the granule coating. In some embodiments, the plurality of graphene particles may cover at least 90% of the outer surface of the granule coating. In some embodiments, the plurality of graphene particles may cover at least 85% of the outer surface of the granule coating. In some embodiments, the plurality of graphene particles may cover at least 80% of the outer surface of the granule coating. In some embodiments, the plurality of graphene particles may cover at least 75% of the outer surface of the granule coating. In some embodiments, the plurality of graphene particles may cover at least 70% of the outer surface of the granule coating. In some embodiments, the plurality of graphene particles may cover at least 65% of the outer surface of the granule coating. In some embodiments, the plurality of graphene particles may cover at least 60% of the outer surface of the granule coating. In some embodiments, the plurality of graphene particles may cover at least 55% of the outer surface of the granule coating. In some embodiments, the plurality of graphene particles may cover at least 50% of the outer surface of the granule coating. In some embodiments, the plurality of graphene particles may cover at least 45% of the outer surface of the granule coating. In some embodiments, the plurality of graphene particles may cover at least 40% of the outer surface of the granule coating. In some embodiments, the plurality of graphene particles may cover at least 35% of the outer surface of the granule coating. In some embodiments, the plurality of graphene particles may cover at least 30% of the outer surface of the granule coating. In some embodiments, the plurality of graphene particles may cover at least 25% of the outer surface of the granule coating. In some embodiments, the plurality of graphene particles may cover at least 20% of the outer surface of the granule coating. In some embodiments, the plurality of graphene particles may cover at least 15% of the outer surface of the granule coating. In some embodiments, the plurality of graphene particles may cover at least 10% of the outer surface of the granule coating. In some embodiments, the plurality of graphene particles may cover at least 5% of the outer surface of the granule coating. In some embodiments, the plurality of graphene particles may cover at least 1% of the outer surface of the granule coating.

In some embodiments, the plurality of graphene particles may cover 10% to 100% of the outer surface of the granule coating. In some embodiments, the plurality of graphene particles may cover 20% to 100% of the outer surface of the granule coating. In some embodiments, the plurality of graphene particles may cover 30% to 100% of the outer surface of the granule coating. In some embodiments, the plurality of graphene particles may cover 40% to 100% of the outer surface of the granule coating. In some embodiments, the plurality of graphene particles may cover 50% to 100% of the outer surface of the granule coating. In some embodiments, the plurality of graphene particles may cover 55% to 100% of the outer surface of the granule coating. In some embodiments, the plurality of graphene particles may cover 60% to 100% of the outer surface of the granule coating. In some embodiments, the plurality of graphene particles may cover 65% to 100% of the outer surface of the granule coating. In some embodiments, the plurality of graphene particles may cover 70% to 100% of the outer surface of the granule coating. In some embodiments, the plurality of graphene particles may cover 75% to 100% of the outer surface of the granule coating. In some embodiments, the plurality of graphene particles may cover 80% to 100% of the outer surface of the granule coating. In some embodiments, the plurality of graphene particles may cover 85% to 100% of the outer surface of the granule coating. In some embodiments, the plurality of graphene particles may cover 90% to 100% of the outer surface of the granule coating. In some embodiments, the plurality of graphene particles may cover 95% to 100% of the outer surface of the granule coating. In some embodiments, the plurality of graphene particles may cover 50% to 95% of the outer surface of the granule coating. In some embodiments, the plurality of graphene particles may cover 50% to 90% of the outer surface of the granule coating. In some embodiments, the plurality of graphene particles may cover 50% to 85% of the outer surface of the granule coating. In some embodiments, the plurality of graphene particles may cover 50% to 80% of the outer surface of the granule coating. In some embodiments, the plurality of graphene particles may cover 50% to 75% of the outer surface of the granule coating. In some embodiments, the plurality of graphene particles may cover 50% to 70% of the outer surface of the granule coating. In some embodiments, the plurality of graphene particles may cover 50% to 65% of the outer surface of the granule coating. In some embodiments, the plurality of graphene particles may cover 50% to 60% of the outer surface of the granule coating. In some embodiments, the plurality of graphene particles may cover 50% to 55% of the outer surface of the granule coating. In some embodiments, the plurality of graphene particles may cover 25% to 99% of the outer surface of the granule coating. In some embodiments, the plurality of graphene particles may cover 25% to 95% of the outer surface of the granule coating. In some embodiments, the plurality of graphene particles may cover 25% to 90% of the outer surface of the granule coating. In some embodiments, the plurality of graphene particles may cover 25% to 85% of the outer surface of the granule coating. In some embodiments, the plurality of graphene particles may cover 25% to 80% of the outer surface of the granule coating. In some embodiments, the plurality of graphene particles may cover 25% to 75% of the outer surface of the granule coating. In some embodiments, the plurality of graphene particles may cover 25% to 70% of the outer surface of the granule coating. In some embodiments, the plurality of graphene particles may cover 25% to 65% of the outer surface of the granule coating. In some embodiments, the plurality of graphene particles may cover 25% to 60% of the outer surface of the granule coating. In some embodiments, the plurality of graphene particles may cover 25% to 55% of the outer surface of the granule coating. In some embodiments, the plurality of graphene particles may cover 25% to 50% of the outer surface of the granule coating.

In some embodiments, the plurality of graphene particles may cover 1% to 100% of the outer surface of the reflective base coating. In some embodiments, the plurality of graphene particles may cover at least 95% of the outer surface of the reflective base coating. In some embodiments, the plurality of graphene particles may cover at least 90% of the outer surface of the reflective base coating. In some embodiments, the plurality of graphene particles may cover at least 85% of the outer surface of the reflective base coating. In some embodiments, the plurality of graphene particles may cover at least 80% of the outer surface of the reflective base coating. In some embodiments, the plurality of graphene particles may cover at least 75% of the outer surface of the reflective base coating. In some embodiments, the plurality of graphene particles may cover at least 70% of the outer surface of the reflective base coating. In some embodiments, the plurality of graphene particles may cover at least 65% of the outer surface of the reflective base coating. In some embodiments, the plurality of graphene particles may cover at least 60% of the outer surface of the reflective base coating. In some embodiments, the plurality of graphene particles may cover at least 55% of the outer surface of the reflective base coating. In some embodiments, the plurality of graphene particles may cover at least 50% of the outer surface of the reflective base coating. In some embodiments, the plurality of graphene particles may cover at least 45% of the outer surface of the reflective base coating. In some embodiments, the plurality of graphene particles may cover at least 40% of the outer surface of the reflective base coating. In some embodiments, the plurality of graphene particles may cover at least 35% of the outer surface of the reflective base coating. In some embodiments, the plurality of graphene particles may cover at least 30% of the outer surface of the reflective base coating. In some embodiments, the plurality of graphene particles may cover at least 25% of the outer surface of the reflective base coating. In some embodiments, the plurality of graphene particles may cover at least 20% of the outer surface of the reflective base coating. In some embodiments, the plurality of graphene particles may cover at least 15% of the outer surface of the reflective base coating. In some embodiments, the plurality of graphene particles may cover at least 10% of the outer surface of the reflective base coating. In some embodiments, the plurality of graphene particles may cover at least 5% of the outer surface of the reflective base coating. In some embodiments, the plurality of graphene particles may cover at least 1% of the outer surface of the reflective base coating.

In some embodiments, the plurality of graphene particles may cover 10% to 100% of the outer surface of the reflective base coating. In some embodiments, the plurality of graphene particles may cover 20% to 100% of the outer surface of the reflective base coating. In some embodiments, the plurality of graphene particles may cover 30% to 100% of the outer surface of the reflective base coating. In some embodiments, the plurality of graphene particles may cover 40% to 100% of the outer surface of the reflective base coating. In some embodiments, the plurality of graphene particles may cover 50% to 100% of the outer surface of the reflective base coating. In some embodiments, the plurality of graphene particles may cover 55% to 100% of the outer surface of the reflective base coating. In some embodiments, the plurality of graphene particles may cover 60% to 100% of the outer surface of the reflective base coating. In some embodiments, the plurality of graphene particles may cover 65% to 100% of the outer surface of the reflective base coating. In some embodiments, the plurality of graphene particles may cover 70% to 100% of the outer surface of the reflective base coating. In some embodiments, the plurality of graphene particles may cover 75% to 100% of the outer surface of the reflective base coating. In some embodiments, the plurality of graphene particles may cover 80% to 100% of the outer surface of the reflective base coating. In some embodiments, the plurality of graphene particles may cover 85% to 100% of the outer surface of the reflective base coating. In some embodiments, the plurality of graphene particles may cover 90% to 100% of the outer surface of the reflective base coating. In some embodiments, the plurality of graphene particles may cover 95% to 100% of the outer surface of the reflective base coating. In some embodiments, the plurality of graphene particles may cover 50% to 95% of the outer surface of the reflective base coating. In some embodiments, the plurality of graphene particles may cover 50% to 90% of the outer surface of the reflective base coating. In some embodiments, the plurality of graphene particles may cover 50% to 85% of the outer surface of the reflective base coating. In some embodiments, the plurality of graphene particles may cover 50% to 80% of the outer surface of the reflective base coating. In some embodiments, the plurality of graphene particles may cover 50% to 75% of the outer surface of the reflective base coating. In some embodiments, the plurality of graphene particles may cover 50% to 70% of the outer surface of the reflective base coating. In some embodiments, the plurality of graphene particles may cover 50% to 65% of the outer surface of the reflective base coating. In some embodiments, the plurality of graphene particles may cover 50% to 60% of the outer surface of the reflective base coating. In some embodiments, the plurality of graphene particles may cover 50% to 55% of the outer surface of the reflective base coating. In some embodiments, the plurality of graphene particles may cover 25% to 99% of the outer surface of the reflective base coating. In some embodiments, the plurality of graphene particles may cover 25% to 95% of the outer surface of the reflective base coating. In some embodiments, the plurality of graphene particles may cover 25% to 90% of the outer surface of the reflective base coating. In some embodiments, the plurality of graphene particles may cover 25% to 85% of the outer surface of the reflective base coating. In some embodiments, the plurality of graphene particles may cover 25% to 80% of the outer surface of the reflective base coating. In some embodiments, the plurality of graphene particles may cover 25% to 75% of the outer surface of the reflective base coating. In some embodiments, the plurality of graphene particles may cover 25% to 70% of the outer surface of the reflective base coating. In some embodiments, the plurality of graphene particles may cover 25% to 65% of the outer surface of the reflective base coating. In some embodiments, the plurality of graphene particles may cover 25% to 60% of the outer surface of the reflective base coating. In some embodiments, the plurality of graphene particles may cover 25% to 55% of the outer surface of the reflective base coating. In some embodiments, the plurality of graphene particles may cover 25% to 50% of the outer surface of the reflective base coating.

In some embodiments, the plurality of graphene particles having a thickness of 10 nm to 800 µm. In some embodiments, the plurality of graphene particles having a thickness of 10 nm to 700 µm. In some embodiments, the plurality of graphene particles having a thickness of 10 nm to 600 µm. In some embodiments, the plurality of graphene particles having a thickness of 10 nm to 500 µm. In some embodiments, the plurality of graphene particles having a thickness of 10 nm to 400 µm. In some embodiments, the plurality of graphene particles having a thickness of 10 nm to 300 µm. In some embodiments, the plurality of graphene particles having a thickness of 10 nm to 200 µm. In some embodiments, the plurality of graphene particles having a thickness of 10 nm to 100 µm. In some embodiments, the plurality of graphene particles having a thickness of 10 nm to 1 µm. In some embodiments, the plurality of graphene particles having a thickness of 10 nm to 900 nm. In some embodiments, the plurality of graphene particles having a thickness of 10 nm to 800 nm. In some embodiments, the plurality of graphene particles having a thickness of 10 nm to 700 nm. In some embodiments, the plurality of graphene particles having a thickness of 10 nm to 600 nm. In some embodiments, the plurality of graphene particles having a thickness of 10 nm to 500 nm. In some embodiments, the plurality of graphene particles having a thickness of 10 nm to 400 nm. In some embodiments, the plurality of graphene particles having a thickness of 10 nm to 300 nm. In some embodiments, the plurality of graphene particles having a thickness of 10 nm to 200 nm. In some embodiments, the plurality of graphene particles having a thickness of 10 nm to 100 nm. In some embodiments, the thickness of the plurality of graphene particles is a thickness of the plurality of graphene particles on a surface.

In some embodiments, the plurality of graphene particles having a thickness of 100 nm to 800 µm. In some embodiments, the plurality of graphene particles having a thickness of 200 nm to 800 µm. In some embodiments, the plurality of graphene particles having a thickness of 300 nm to 800 µm. In some embodiments, the plurality of graphene particles having a thickness of 400 nm to 800 µm. In some embodiments, the plurality of graphene particles having a thickness of 500 nm to 800 µm. In some embodiments, the plurality of graphene particles having a thickness of 600 nm to 800 µm. In some embodiments, the plurality of graphene particles having a thickness of 700 nm to 800 µm. In some embodiments, the plurality of graphene particles having a thickness of 800 nm to 800 µm. In some embodiments, the plurality of graphene particles having a thickness of 900 nm to 800 µm. In some embodiments, the plurality of graphene particles having a thickness of 1 µm to 800 µm. In some embodiments, the plurality of graphene particles having a thickness of 100 µm to 800 µm. In some embodiments, the plurality of graphene particles having a thickness of 200 µm to 800 µm. In some embodiments, the plurality of graphene particles having a thickness of 300 µm to 800 µm. In some embodiments, the plurality of graphene particles having a thickness of 400 µm to 800 µm. In some embodiments, the plurality of graphene particles having a thickness of 500 µm to 800 µm. In some embodiments, the plurality of graphene particles having a thickness of 600 µm to 800 µm. In some embodiments, the plurality of graphene particles having a thickness of 700 µm to 800 µm. In some embodiments, the thickness of the plurality of graphene particles is a thickness of the plurality of graphene particles on a surface.

In some embodiments, the plurality of graphene particles having a thickness of 50 nm to 50 µm. In some embodiments, the plurality of graphene particles having a thickness of 50 nm to 45 µm. In some embodiments, the plurality of graphene particles having a thickness of 50 nm to 40 µm. In some embodiments, the plurality of graphene particles having a thickness of 50 nm to 35 µm. In some embodiments, the plurality of graphene particles having a thickness of 50 nm to 30 µm. In some embodiments, the plurality of graphene particles having a thickness of 50 nm to 25 µm. In some embodiments, the plurality of graphene particles having a thickness of 50 nm to 20 µm. In some embodiments, the plurality of graphene particles having a thickness of 50 nm to 15 µm. In some embodiments, the plurality of graphene particles having a thickness of 50 nm to 10 µm. In some embodiments, the plurality of graphene particles having a thickness of 50 nm to 5 µm. In some embodiments, the plurality of graphene particles having a thickness of 50 nm to 1 µm. In some embodiments, the plurality of graphene particles having a thickness of 50 nm to 900 nm. In some embodiments, the plurality of graphene particles having a thickness of 50 nm to 800 nm. In some embodiments, the plurality of graphene particles having a thickness of 50 nm to 800 nm. In some embodiments, the plurality of graphene particles having a thickness of 50 nm to 700 nm. In some embodiments, the plurality of graphene particles having a thickness of 50 nm to 600 nm. In some embodiments, the plurality of graphene particles having a thickness of 50 nm to 500 nm. In some embodiments, the plurality of graphene particles having a thickness of 50 nm to 400 nm. In some embodiments, the plurality of graphene particles having a thickness of 50 nm to 300 nm. In some embodiments, the plurality of graphene particles having a thickness of 50 nm to 200 nm. In some embodiments, the plurality of graphene particles having a thickness of 50 nm to 100 nm. In some embodiments, the thickness of the plurality of graphene particles is a thickness of the plurality of graphene particles on a surface. In some embodiments, a thickness of graphene particles on a surface in these ranges is sufficient to maximize reflectivity (e.g., relative to thicknesses outside the ranges).

In some embodiments, the plurality of graphene particles having a thickness of 100 nm to 50 µm. In some embodiments, the plurality of graphene particles having a thickness of 200 nm to 50 µm. In some embodiments, the plurality of graphene particles having a thickness of 300 nm to 50 µm.

In some embodiments, the plurality of graphene particles having a thickness of 400 nm to 50 µm. In some embodiments, the plurality of graphene particles having a thickness of 500 nm to 50 µm. In some embodiments, the plurality of graphene particles having a thickness of 600 nm to 50 µm. In some embodiments, the plurality of graphene particles having a thickness of 700 nm to 50 µm. In some embodiments, the plurality of graphene particles having a thickness of 800 nm to 50 µm. In some embodiments, the plurality of graphene particles having a thickness of 900 nm to 50 µm. In some embodiments, the plurality of graphene particles having a thickness of 1 µm to 50 µm. In some embodiments, the plurality of graphene particles having a thickness of 5 µm to 50 µm. In some embodiments, the plurality of graphene particles having a thickness of 10 µm to 50 µm. In some embodiments, the plurality of graphene particles having a thickness of 15 µm to 50 µm. In some embodiments, the plurality of graphene particles having a thickness of 20 µm to 50 µm. In some embodiments, the plurality of graphene particles having a thickness of 25 µm to 50 µm. In some embodiments, the plurality of graphene particles having a thickness of 30 µm to 50 µm. In some embodiments, the plurality of graphene particles having a thickness of 35 µm to 50 µm. In some embodiments, the plurality of graphene particles having a thickness of 40 µm to 50 µm. In some embodiments, the plurality of graphene particles having a thickness of 45 µm to 50 µm. In some embodiments, the thickness of the plurality of graphene particles is a thickness of the plurality of graphene particles on a surface. In some embodiments, a thickness of graphene particles on a surface in these ranges is sufficient to maximize reflectivity (e.g., relative to thicknesses outside the ranges).

In some embodiments, the reflective base coating may comprise, consist of, or consist essentially of at least one of the following: at least one pigment, at least one dye, or any combination thereof. In some embodiments, the reflective base coating may comprise, consist of, or consist essentially of at least one of a reflective pigment, a transitional metal oxide, a cool pigment, a metallic pigment, a metallic particle, a mirrored pigment, a light scattering additive, an opacifier, a thin-film coated particle, a near infrared-reflecting pigment, light-interference platelet pigment, a silica pigment, a metal flake pigment, or a combination thereof. Non-limiting examples of pigments and dyes include, without limitation, at least one of a colorant, an infrared reflective pigment/dye, a phosphorescence pigment/dye, a fluorescence pigment/dye, or any combination thereof. In some embodiments, the reflective base coating may comprise, consist of, or consist essentially of at least one of $TiO_2$, alumina, silica, iron oxide, tin oxide, $SiO_2$, aluminum oxide, mica, rutile, anatase, alloys, aluminum, iron, copper, brass, titanium, cobalt, stainless steel, chromium, nickel, or any combination thereof.

Some examples of commercially available materials suitable for inclusion in the reflective base coating include, without limitation, at least one of Colonial Red, which is a reflective pigment that is available from Americhem Inc., Cuyahoga Falls, Ohio; Ti Pure™ Titanium Dioxide from Chemours, Wilmington, Delaware; pigments available from Wenzhou Pearlescent Pigments Co., Ltd., No. 9 Small East District, Wenzhou Economical and Technical Development Zone, Peoples Republic of China, such as Taizhu TZ5013 (mica, rutile titanium dioxide and iron oxide, golden color), TZ5012 (mica, rutile titanium dioxide and iron oxide, golden color), TZ4013 (mica and iron oxide, wine red color), TZ4012 (mica and iron oxide, red brown color), TZ4011 (mica and iron oxide, bronze color), TZ2015 (mica and rutile titanium dioxide, interference green color), TZ2014 (mica and rutile titanium dioxide, interference blue color), TZ2013 (mica and rutile titanium dioxide, interference violet color), TZ2012 (mica and rutile titanium dioxide, interference red color), TZ2011 (mica and rutile titanium dioxide, interference golden color), TZ1222 (mica and rutile titanium dioxide, silver white color), TZ1004 (mica and anatase titanium dioxide, silver white color), TZ4001/600 (mica and iron oxide, bronze appearance), TZ5003/600 (mica, titanium oxide and iron oxide, gold appearance), TZ1001/80 (mica and titanium dioxide, off-white appearance), TZ2001/600 (mica, titanium dioxide, tin oxide, off-white/gold appearance), TZ2004/600 (mica, titanium dioxide, tin oxide, off-white/blue appearance), TZ2005/600 (mica, titanium dioxide, tin oxide, off-white/green appearance), TZ4002/600 (mica and iron oxide, bronze appearance); pigments available from Merck KGaA, Darmstadt, Germany, such as Iriodin® pearlescent pigment based on mica covered with a thin layer of titanium dioxide and/or iron oxide; Xirallic™ high chroma crystal effect pigment based upon aluminum oxide platelets coated with metal oxides, including Xirallic T 60-10 WNT crystal silver, Xirallic T 60-20 WNT sunbeam gold, and Xirallic F 60-50 WNT fireside copper; ColorStream™ multi color effect pigments based on $SiO_2$ platelets coated with metal oxides, including ColorStream F 20-00 WNT autumn mystery and ColorStream F 20-07 WNT viola fantasy; Chrom Brite™ CB4500, available from Bead Brite, 400 Oser Ave, Suite 600, Hauppauge, N.Y. 11788; pigments available from Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black.

In some embodiments, the reflective base coating may comprise, consist of, or consist essentially of a plurality of voids. In some embodiments, the reflective base coating may define or may be configured to define a plurality of voids.

In some embodiments, the reflective base coating may cover at least 95% of the outer surface of the roofing granule. In some embodiments, the reflective base coating may cover at least 90% of the outer surface of the roofing granule. In some embodiments, the reflective base coating may cover at least 85% of the outer surface of the roofing granule. In some embodiments, the reflective base coating may cover at least 80% of the outer surface of the roofing granule. In some embodiments, the reflective base coating may cover at least 75% of the outer surface of the roofing granule. In some embodiments, the reflective base coating may cover at least 70% of the outer surface of the roofing granule. In some embodiments, the reflective base coating may cover at least 65% of the outer surface of the roofing granule. In some embodiments, the reflective base coating may cover at least 60% of the outer surface of the roofing granule. In some embodiments, the reflective base coating may cover at least 55% of the outer surface of the roofing granule. In some embodiments, the reflective base coating may cover at least 50% of the outer surface of the roofing granule. In some embodiments, the reflective base coating may cover at least 45% of the outer surface of the roofing granule. In some embodiments, the reflective base coating may cover at least 40% of the outer surface of the roofing granule. In some embodiments, the reflective base coating may cover at least 35% of the outer surface of the roofing granule. In some embodiments, the reflective base coating may cover at least 30% of the outer surface of the roofing granule. In some embodiments, the reflective base coating may cover at least 25% of the outer surface of the roofing granule. In some embodiments, the reflective base coating may cover at least 20% of the outer surface of the roofing granule. In some embodiments, the reflective base coating may cover at least 15% of the outer surface of the roofing granule. In some embodiments, the reflective base coating may cover at least 10% of the outer surface of the roofing granule. In some embodiments, the reflective base coating may cover at least 5% of the outer surface of the roofing granule. In some embodiments, the reflective base coating may cover at least 1% of the outer surface of the roofing granule.

In some embodiments, the reflective base coating may cover 1% to 100% of the outer surface of the roofing granule. In some embodiments, the reflective base coating may cover 10% to 100% of the outer surface of the roofing granule. In some embodiments, the reflective base coating may cover 20% to 100% of the outer surface of the roofing granule. In some embodiments, the reflective base coating may cover 30% to 100% of the outer surface of the roofing granule. In some embodiments, the reflective base coating may cover 40% to 100% of the outer surface of the roofing granule. In some embodiments, the reflective base coating may cover 50% to 100% of the outer surface of the roofing granule. In some embodiments, the reflective base coating may cover 55% to 100% of the outer surface of the roofing granule. In some embodiments, the reflective base coating may cover 60% to 100% of the outer surface of the roofing granule. In some embodiments, the reflective base coating may cover 65% to 100% of the outer surface of the roofing granule. In some embodiments, the reflective base coating may cover 70% to 100% of the outer surface of the roofing granule. In some embodiments, the reflective base coating may cover 75% to 100% of the outer surface of the roofing granule. In some embodiments, the reflective base coating may cover 80% to 100% of the outer surface of the roofing granule. In some embodiments, the reflective base coating may cover 85% to 100% of the outer surface of the roofing granule. In some embodiments, the reflective base coating may cover 90% to 100% of the outer surface of the roofing granule. In some embodiments, the reflective base coating may cover 95% to 100% of the outer surface of the roofing granule. In some embodiments, the reflective base coating may cover 50% to 95% of the outer surface of the roofing granule. In some embodiments, the reflective base coating may cover 50% to 90% of the outer surface of the roofing granule. In some embodiments, the reflective base coating may cover 50% to 85% of the outer surface of the roofing granule. In some embodiments, the reflective base coating may cover 50% to 80% of the outer surface of the roofing granule. In some embodiments, the reflective base coating may cover 50% to 75% of the outer surface of the roofing granule. In some embodiments, the reflective base coating may cover 50% to 70% of the outer surface of the roofing granule. In some embodiments, the reflective base coating may cover 50% to 65% of the outer surface of the roofing granule. In some embodiments, the reflective base coating may cover 50% to 60% of the outer surface of the roofing granule. In some embodiments, the reflective base coating may cover 50% to 55% of the outer surface of the roofing granule.

In some embodiments, the reflective base coating may cover at least 95% of the outer surface of the granule coating. In some embodiments, the reflective base coating may cover at least 90% of the outer surface of the granule coating. In some embodiments, the reflective base coating may cover at least 85% of the outer surface of the granule coating. In some embodiments, the reflective base coating may cover at least 80% of the outer surface of the granule coating. In some embodiments, the reflective base coating may cover at least 75% of the outer surface of the granule coating. In some embodiments, the reflective base coating may cover at least 70% of the outer surface of the granule coating. In some embodiments, the reflective base coating may cover at least 65% of the outer surface of the granule coating. In some embodiments, the reflective base coating may cover at least 60% of the outer surface of the granule coating. In some embodiments, the reflective base coating may cover at least 55% of the outer surface of the granule coating. In some embodiments, the reflective base coating may cover at least 50% of the outer surface of the granule coating. In some embodiments, the reflective base coating may cover at least 45% of the outer surface of the granule coating. In some embodiments, the reflective base coating may cover at least 40% of the outer surface of the granule coating. In some embodiments, the reflective base coating may cover at least 35% of the outer surface of the granule coating. In some embodiments, the reflective base coating may cover at least 30% of the outer surface of the granule coating. In some embodiments, the reflective base coating may cover at least 25% of the outer surface of the granule coating. In some embodiments, the reflective base coating may cover at least 20% of the outer surface of the granule coating. In some embodiments, the reflective base coating may cover at least 15% of the outer surface of the granule coating. In some embodiments, the reflective base coating may cover at least 10% of the outer surface of the granule coating. In some embodiments, the reflective base coating may cover at least 5% of the outer surface of the granule coating. In some embodiments, the reflective base coating may cover at least 1% of the outer surface of the granule coating.

In some embodiments, the reflective base coating may cover 1% to 100% of the outer surface of the granule coating. In some embodiments, the reflective base coating may cover 10% to 100% of the outer surface of the granule coating. In some embodiments, the reflective base coating may cover 20% to 100% of the outer surface of the granule coating. In some embodiments, the reflective base coating may cover 30% to 100% of the outer surface of the granule coating. In some embodiments, the reflective base coating may cover 40% to 100% of the outer surface of the granule coating. In some embodiments, the reflective base coating may cover 50% to 100% of the outer surface of the granule coating. In some embodiments, the reflective base coating may cover 55% to 100% of the outer surface of the granule coating. In some embodiments, the reflective base coating may cover 60% to 100% of the outer surface of the granule coating. In some embodiments, the reflective base coating may cover 65% to 100% of the outer surface of the granule coating. In some embodiments, the reflective base coating may cover 70% to 100% of the outer surface of the granule coating. In some embodiments, the reflective base coating may cover 75% to 100% of the outer surface of the granule coating. In some embodiments, the reflective base coating may cover 80% to 100% of the outer surface of the granule coating. In some embodiments, the reflective base coating may cover 85% to 100% of the outer surface of the granule coating. In some embodiments, the reflective base coating may cover 90% to 100% of the outer surface of the granule coating. In some embodiments, the reflective base coating may cover 95% to 100% of the outer surface of the granule coating. In some embodiments, the reflective base coating may cover 50% to 95% of the outer surface of the granule coating. In some embodiments, the reflective base coating may cover 50% to 90% of the outer surface of the granule coating. In some embodiments, the reflective base coating may cover 50% to 85% of the outer surface of the granule coating. In some embodiments, the reflective base coating may cover 50% to 80% of the outer surface of the granule coating. In some embodiments, the reflective base coating may cover 50% to 75% of the outer surface of the granule coating. In some embodiments, the reflective base coating may cover 50% to 70% of the outer surface of the granule coating. In some embodiments, the reflective base coating may cover 50% to 65% of the outer surface of the granule coating. In some embodiments, the reflective base coating may cover 50% to 60% of the outer surface of the granule coating. In some embodiments, the reflective base coating may cover 50% to 55% of the outer surface of the granule coating.

In some embodiments, the reflective base coating may have a thickness of 0.001 mil to 75 mil. In some embodiments, the reflective base coating layer may have a thickness of 0.1 mil to 50 mil. In some embodiments, the reflective base coating layer may have a thickness of 0.1 mil to 50 mil. In some embodiments, the reflective base coating layer may have a thickness of 0.1 mil to 45 mil. In some embodiments, the reflective base coating layer may have a thickness of 0.1 mil to 40 mil. In some embodiments, the reflective base coating layer may have a thickness of 0.1 mil to 35 mil. In some embodiments, the reflective base coating layer may have a thickness of 0.1 mil to 30 mil. In some embodiments, the reflective base coating layer may have a thickness of 0.1 mil to 25 mil. In some embodiments, the reflective base coating layer may have a thickness of 0.1 mil to 24 mil. In some embodiments, the reflective base coating layer may have a thickness of 0.1 mil to 22 mil. In some embodiments, the reflective base coating layer may have a thickness of 0.1 mil to 20 mil. In some embodiments, the reflective base coating layer may have a thickness of 0.1 mil to 18 mil. In some embodiments, the reflective base coating layer may have a thickness of 0.1 mil to 16 mil. In some embodiments, the reflective base coating layer may have a thickness of 0.1 mil to 15 mil. In some embodiments, the reflective base coating layer may have a thickness of 0.1 mil to 14 mil. In some embodiments, the reflective base coating layer may have a thickness of 0.1 mil to 12 mil. In some embodiments, the reflective base coating layer may have a thickness of 0.1 mil to 10 mil. In some embodiments, the reflective base coating layer may have a thickness of 0.1 mil to 8 mil. In some embodiments, the reflective base coating layer may have a thickness of 0.1 mil to 6 mil. In some embodiments, the reflective base coating layer may have a thickness of 0.1 mil to 5 mil.

In some embodiments, the reflective base coating layer may have a thickness of 1 mil to 50 mil. In some embodiments, the reflective base coating layer may have a thickness of 5 mil to 50 mil. In some embodiments, the reflective base coating layer may have a thickness of 6 mil to 50 mil. In some embodiments, the reflective base coating layer may have a thickness of 8 mil to 50 mil. In some embodiments, the reflective base coating layer may have a thickness of 10 mil to 50 mil. In some embodiments, the reflective base coating layer may have a thickness of 12 mil to 50 mil. In some embodiments, the reflective base coating layer may have a thickness of 14 mil to 50 mil. In some embodiments, the reflective base coating layer may have a thickness of 15 mil to 50 mil. In some embodiments, the reflective base coating layer may have a thickness of 16 mil to 50 mil. In some embodiments, the reflective base coating layer may have a thickness of 18 mil to 50 mil. In some embodiments, the reflective base coating layer may have a thickness of 20 mil to 50 mil. In some embodiments, the reflective base coating layer may have a thickness of 22 mil to 50 mil. In some embodiments, the reflective base coating layer may have a thickness of 24 mil to 50 mil. In some embodiments, the reflective base coating layer may have a thickness of 25 mil to 50 mil. In some embodiments, the reflective base coating layer may have a thickness of 30 mil to 50 mil. In some embodiments, the reflective base coating layer may have a thickness of 35 mil to 50 mil. In some embodiments, the reflective base coating layer may have a thickness of 40 mil to 50 mil. In some embodiments, the reflective base coating layer may have a thickness of 45 mil to 50 mil. In some embodiments, the reflective base coating layer may have a thickness of 5 mil to 35 mil. In some embodiments, the reflective base coating layer may have a thickness of 5 mil to 15 mil. In some embodiments, the reflective base coating layer may have a thickness of 6 mil to 10 mil. In some embodiments, the reflective base coating layer may have a thickness of 25 mil to 35 mil. In some embodiments, the reflective base coating layer may have a thickness of 20 mil to 30 mil.

In some embodiments, the solar reflectivity of the at least one roofing granule (e.g., the coated roofing granule, the plurality of the coated roofing granules, etc.), the granule coating, the roofing material, or any combination thereof is at least 5%. In some embodiments, the solar reflectivity of the at least one roofing granule (e.g., the coated roofing granule, the plurality of the coated roofing granules, etc.), the granule coating, the roofing material, or any combination thereof is at least 6%. In some embodiments, the solar reflectivity of the at least one roofing granule (e.g., the coated roofing granule, the plurality of the coated roofing granules, etc.), the granule coating, the roofing material, or any combination thereof is at least 7%. In some embodiments, the solar reflectivity of the at least one roofing granule (e.g., the coated roofing granule, the plurality of the coated roofing granules, etc.), the granule coating, the roofing material, or any combination thereof is at least 8%. In some embodiments, the solar reflectivity of the at least one roofing granule (e.g., the coated roofing granule, the plurality of the coated roofing granules, etc.), the granule coating, the roofing material, or any combination thereof is at least 9%. In some embodiments, the solar reflectivity of the at least one roofing granule (e.g., the coated roofing granule, the plurality of the coated roofing granules, etc.), the granule coating, the roofing material, or any combination thereof is at least 10%. In some embodiments, the solar reflectivity of the at least one roofing granule (e.g., the coated roofing granule, the plurality of the coated roofing granules, etc.), the granule coating, the roofing material, or any combination thereof is at least 11%. In some embodiments, the solar reflectivity of the at least one roofing granule (e.g., the coated roofing granule, the plurality of the coated roofing granules, etc.), the granule coating, the roofing material, or any combination thereof is at least 12%. In some embodiments, the solar reflectivity of the at least one roofing granule (e.g., the coated roofing granule, the plurality of the coated roofing granules, etc.), the granule coating, the roofing material, or any combination thereof is at least 13%. In some embodiments, the solar reflectivity of the at least one roofing granule (e.g., the coated roofing granule, the plurality of the coated roofing granules, etc.), the granule coating, the roofing material, or any combination thereof is at least 14%. In some embodiments, the solar reflectivity of the at least one roofing granule (e.g., the coated roofing granule, the plurality of the coated roofing granules, etc.), the granule coating, the roofing material, or any combination thereof is at least 15%. In some embodiments, the solar reflectivity of the at least one roofing granule (e.g., the coated roofing granule, the plurality of the coated roofing granules, etc.), the granule coating, the roofing material, or any combination thereof is at least 16%. In some embodiments, the solar reflectivity of the at least one roofing granule (e.g., the coated roofing granule, the plurality of the coated roofing granules, etc.), the granule coating, the roofing material, or any combination thereof is at least 17%. In some embodiments, the solar reflectivity of the at least one roofing granule (e.g., the coated roofing granule, the plurality of the coated roofing granules, etc.), the granule coating, the roofing material, or any combination thereof is at least 18%. In some embodiments, the solar reflectivity of the at least one roofing granule (e.g., the coated roofing granule, the plurality of the coated roofing granules, etc.), the granule coating, the roofing material, or any combination thereof is at least 19%. In some embodiments, the solar reflectivity of the at least one roofing granule (e.g., the coated roofing granule, the plurality of the coated roofing granules, etc.), the granule coating, the roofing material, or any combination thereof is at least 20%. In some embodiments, the solar reflectivity of the at least one roofing granule (e.g., the coated roofing granule, the plurality of the coated roofing granules, etc.), the granule coating, the roofing material, or any combination thereof is at least 21%. In some embodiments, the solar reflectivity of the at least one roofing granule (e.g., the coated roofing granule, the plurality of the coated roofing granules, etc.), the granule coating, the roofing material, or any combination thereof is at least 22%. In some embodiments, the solar reflectivity of the at least one roofing granule (e.g., the coated roofing granule, the plurality of the coated roofing granules, etc.), the granule coating, the roofing material, or any combination thereof is at least 23%. In some embodiments, the solar reflectivity of the at least one roofing granule (e.g., the coated roofing granule, the plurality of the coated roofing granules, etc.), the granule coating, the roofing material, or any combination thereof is at least 24%. In some embodiments, the solar reflectivity of the at least one roofing granule (e.g., the coated roofing granule, the plurality of the coated roofing granules, etc.), the granule coating, the roofing material, or any combination thereof is at least 25%. In some embodiments, the solar reflectivity of the at least one roofing granule (e.g., the coated roofing granule, the plurality of the coated roofing granules, etc.), the granule coating, the roofing material, or any combination thereof is at least 30%. In some embodiments, the solar reflectivity of the at least one roofing granule (e.g., the coated roofing granule, the plurality of the coated roofing granules, etc.), the granule coating, the roofing material, or any combination thereof is at least 35%. In some embodiments, the solar reflectivity of the at least one roofing granule (e.g., the coated roofing granule, the plurality of the coated roofing granules, etc.), the granule coating, the roofing material, or any combination thereof is at least 40%. In some embodiments, the total solar reflectance may be measured via a portable reflectometer according to ASTM C1549.

In some embodiments, the solar reflectivity of the at least one roofing granule (e.g., the coated roofing granule, the plurality of the coated roofing granules, etc.), the granule coating, the roofing material, or any combination thereof is 5% to 100%. In some embodiments, the solar reflectivity of the at least one roofing granule (e.g., the coated roofing granule, the plurality of the coated roofing granules, etc.), the granule coating, the roofing material, or any combination thereof is 5% to 40%. In some embodiments, the solar reflectivity of the at least one roofing granule (e.g., the coated roofing granule, the plurality of the coated roofing granules, etc.), the granule coating, the roofing material, or any combination thereof is 10% to 40%. In some embodiments, the solar reflectivity of the at least one roofing granule (e.g., the coated roofing granule, the plurality of the coated roofing granules, etc.), the granule coating, the roofing material, or any combination thereof is 10% to 35%. In some embodiments, the solar reflectivity of the at least one roofing granule (e.g., the coated roofing granule, the plurality of the coated roofing granules, etc.), the granule coating, the roofing material, or any combination thereof is 10% to 30%. In some embodiments, the solar reflectivity of the at least one roofing granule (e.g., the coated roofing granule, the plurality of the coated roofing granules, etc.), the granule coating, the roofing material, or any combination thereof is 10% to 25%. In some embodiments, the solar reflectivity of the at least one roofing granule (e.g., the coated roofing granule, the plurality of the coated roofing granules, etc.), the granule coating, the roofing material, or any combination thereof is 15% to 40%. In some embodiments, the solar reflectivity of the at least one roofing granule (e.g., the coated roofing granule, the plurality of the coated roofing granules, etc.), the granule coating, the roofing material, or any combination thereof is 15% to 35%. In some embodiments, the solar reflectivity of the at least one roofing granule (e.g., the coated roofing granule, the plurality of the coated roofing granules, etc.), the granule coating, the roofing material, or any combination thereof is 15% to 30%. In some embodiments, the solar reflectivity of the at least one roofing granule (e.g., the coated roofing granule, the plurality of the coated roofing granules, etc.), the granule coating, the roofing material, or any combination thereof is 15% to 25%.

In some embodiments, the solar reflectivity of the at least one roofing granule (e.g., the coated roofing granule, the plurality of the coated roofing granules, etc.), the granule coating, the roofing material, or any combination thereof is 16% to 30%. In some embodiments, the solar reflectivity of the at least one roofing granule (e.g., the coated roofing granule, the plurality of the coated roofing granules, etc.), the granule coating, the roofing material, or any combination thereof is 17% to 30%. In some embodiments, the solar reflectivity of the at least one roofing granule (e.g., the coated roofing granule, the plurality of the coated roofing granules, etc.), the granule coating, the roofing material, or any combination thereof is 18% to 30%. In some embodiments, the solar reflectivity of the at least one roofing granule (e.g., the coated roofing granule, the plurality of the coated roofing granules, etc.), the granule coating, the roofing material, or any combination thereof is 19% to 30%. In some embodiments, the solar reflectivity of the at least one roofing granule (e.g., the coated roofing granule, the plurality of the coated roofing granules, etc.), the granule coating, the roofing material, or any combination thereof is 20% to 30%. In some embodiments, the solar reflectivity of the at least one roofing granule (e.g., the coated roofing granule, the plurality of the coated roofing granules, etc.), the granule coating, the roofing material, or any combination thereof is 11% to 25%. In some embodiments, the solar reflectivity of the at least one roofing granule (e.g., the coated roofing granule, the plurality of the coated roofing granules, etc.), the granule coating, the roofing material, or any combination thereof is 12% to 25%. In some embodiments, the solar reflectivity of the at least one roofing granule (e.g., the coated roofing granule, the plurality of the coated roofing granules, etc.), the granule coating, the roofing material, or any combination thereof is 13% to 25%. In some embodiments, the solar reflectivity of the at least one roofing granule (e.g., the coated roofing granule, the plurality of the coated roofing granules, etc.), the granule coating, the roofing material, or any combination thereof is 14% to 25%. In some embodiments, the solar reflectivity of the at least one roofing granule (e.g., the coated roofing granule, the plurality of the coated roofing granules, etc.), the granule coating, the roofing material, or any combination thereof is 15% to 25%. In some embodiments, the total solar reflectance may be measured via a portable reflectometer according to ASTM C1549.

In some embodiments, the total solar reflectance of the at least one roofing granule (e.g., the coated roofing granule, the plurality of the coated roofing granules, etc.), the granule coating, the roofing material (e.g., a roofing shingle), or any combination thereof is compared to the total solar reflectance of a roofing granule control (e.g., a plurality of roofing granule controls), a granule coating control, a roofing material control (e.g., a roofing shingle control), or any combination thereof, respectively, wherein the roofing granule control, the granule coating control, the roofing material control, or any combination thereof does not comprise graphene. In some embodiments, the total solar reflectance of the at least one roofing granule (e.g., the coated roofing granule, the plurality of the coated roofing granules, etc.), the granule coating, the roofing material (e.g., the roofing shingle), or any combination thereof is greater than the total solar reflectance of the roofing granule control (e.g., the plurality of the roofing granule controls), the granule coating control, the roofing material control (e.g., the roofing shingle control), or any combination thereof, respectively. In some embodiments, the total solar reflectance of the at least one roofing granule (e.g., the coated roofing granule, the plurality of the coated roofing granules, etc.), the granule coating, the roofing material (e.g., a roofing shingle), or any combination thereof is at least 4% greater, at least 5% greater, at least 6% greater, at least 8% greater, at least 10% greater, at least 12% greater, at least 14% greater, at least 15% greater, at least 16% greater, at least 18% greater, at least 20% greater, at least 22% greater, at least 24% greater, at least 25% greater, at least 26% greater, at least 28% greater, at least 30% greater, at least 32% greater, at least 34% greater, at least 35% greater, at least 40% greater, at least 45% greater, at least 50% greater, at least 55% greater, at least 60% greater, at least 65% greater, at least 70% greater, at least 75% greater, or at least 80% greater, than the total solar reflectance of the roofing granule control (e.g., the plurality of the roofing granule controls), the granule coating control, the roofing material control (e.g., a roofing shingle control), or any combination thereof, respectively. In some embodiments, the total solar reflectance of the at least one roofing granule (e.g., the coated roofing granule, the plurality of the coated roofing granules, etc.), the granule coating, the roofing material (e.g., a roofing shingle), or any combination thereof is 4% to 100% greater, 5% to 100% greater, 6% to 100% greater, 8% to 100% greater, 10% to 100% greater, 11% to 100% greater, 12% to 100% greater, 13% to 100% greater, 14% to 100% greater, 15% to 100% greater, 16% to 100% greater, 17% to 100% greater, 18% to 100% greater, 19% to 100% greater, 20% to 100% greater, 22% to 100% greater, 24% to 100% greater, 25% to 100% greater, 26% to 100% greater, 28% to 100% greater, 30% to 100% greater, 32% to 100% greater, 34% to 100% greater, 35% to 100% greater, 40% to 100% greater, 45% to 100% greater, 50% to 100% greater, 55% to 100% greater, 60% to 100% greater, 65% to 100% greater, 70% to 100% greater, 75% to 100% greater, or 80% to 100% greater, than the total solar reflectance of the roofing granule control (e.g., the plurality of the roofing granule controls), the granule coating control, the roofing material control (e.g., a roofing shingle control), or any combination thereof, respectively. In some embodiments, the total solar reflectance may be measured via a portable reflectometer according to ASTM C1549.

In some embodiments, the at least one roofing granule (e.g., the coated roofing granule, the plurality of the coated roofing granules, etc.), the granule coating, the roofing material, or any combination thereof has a CIELAB color value comprising an L* value of 50 or less. In some embodiments, the at least one roofing granule (e.g., the coated roofing granule, the plurality of the coated roofing granules, etc.), the granule coating, the roofing material, or any combination thereof has a CIELAB color value comprising an L* value of 45 or less. In some embodiments, the at least one roofing granule (e.g., the coated roofing granule, the plurality of the coated roofing granules, etc.), the granule coating, the roofing material, or any combination thereof has a CIELAB color value comprising an L* value of 40 or less. In some embodiments, the at least one roofing granule (e.g., the coated roofing granule, the plurality of the coated roofing granules, etc.), the granule coating, the roofing material, or any combination thereof has a CIELAB color value comprising an L* value of 35 or less. In some embodiments, the at least one roofing granule (e.g., the coated roofing granule, the plurality of the coated roofing granules, etc.), the granule coating, the roofing material, or any combination thereof has a CIELAB color value comprising an L* value of 30 or less. In some embodiments, the at least one roofing granule (e.g., the coated roofing granule, the plurality of the coated roofing granules, etc.), the granule coating, the roofing material, or any combination thereof has a CIELAB color value comprising an L* value of 25 or less. In some embodiments, the at least one roofing granule (e.g., the coated roofing granule, the plurality of the coated roofing granules, etc.), the granule coating, the roofing material, or any combination thereof has a CIELAB color value comprising an L* value of 20 or less. In some embodiments, the at least one roofing granule (e.g., the coated roofing granule, the plurality of the coated roofing granules, etc.), the granule coating, the roofing material, or any combination thereof has a CIELAB color value comprising an L* value of 15 or less. In some embodiments, the at least one roofing granule (e.g., the coated roofing granule, the plurality of the coated roofing granules, etc.), the granule coating, the roofing material, or any combination thereof has a CIELAB color value comprising an L* value of 10 or less. In some embodiments, the at least one roofing granule (e.g., the coated roofing granule, the plurality of the coated roofing granules, etc.), the granule coating, the roofing material, or any combination thereof has a CIELAB color value comprising an L* value of 9 or less. In some embodiments, the at least one roofing granule (e.g., the coated roofing granule, the plurality of the coated roofing granules, etc.), the granule coating, the roofing material, or any combination thereof has a CIELAB color value comprising an L* value of 8 or less.

In some embodiments, the at least one roofing granule (e.g., the coated roofing granule, the plurality of the coated roofing granules, etc.), the granule coating, the roofing material, or any combination thereof has a CIELAB color value comprising an L* value range of 0<L*<50. In some embodiments, the at least one roofing granule (e.g., the coated roofing granule, the plurality of the coated roofing granules, etc.), the granule coating, the roofing material, or any combination thereof has a CIELAB color value comprising an L* value range of 0<L*<45. In some embodiments, the at least one roofing granule (e.g., the coated roofing granule, the plurality of the coated roofing granules, etc.), the granule coating, the roofing material, or any combination thereof has a CIELAB color value comprising an L* value range of 0<L*<40. In some embodiments, the at least one roofing granule (e.g., the coated roofing granule, the plurality of the coated roofing granules, etc.), the granule coating, the roofing material, or any combination thereof has a CIELAB color value comprising an L* value range of 0<L*<35. In some embodiments, the at least one roofing granule (e.g., the coated roofing granule, the plurality of the coated roofing granules, etc.), the granule coating, the roofing material, or any combination thereof has a CIELAB color value comprising an L* value range of 0<L*<30. In some embodiments, the at least one roofing granule (e.g., the coated roofing granule, the plurality of the coated roofing granules, etc.), the granule coating, the roofing material, or any combination thereof has a CIELAB color value comprising an L* value range of 0<L*<25. In some embodiments, the at least one roofing granule (e.g., the coated roofing granule, the plurality of the coated roofing granules, etc.), the granule coating, the roofing material, or any combination thereof has a CIELAB color value comprising an L* value range of 0<L*<20. In some embodiments, the at least one roofing granule (e.g., the coated roofing granule, the plurality of the coated roofing granules, etc.), the granule coating, the roofing material, or any combination thereof has a CIELAB color value comprising an L* value range of 0<L*<15. In some embodiments, the at least one roofing granule (e.g., the coated roofing granule, the plurality of the coated roofing granules, etc.), the granule coating, the roofing material, or any combination thereof has a CIELAB color value comprising an L* value range of 0<L*<10. In some embodiments, the at least one roofing granule (e.g., the coated roofing granule, the plurality of the coated roofing granules, etc.), the granule coating, the roofing material, or any combination thereof has a CIELAB color value comprising an L* value range of 0<L*<9. In some embodiments, the at least one roofing granule (e.g., the coated roofing granule, the plurality of the coated roofing granules, etc.), the granule coating, the roofing material, or any combination thereof has a CIELAB color value comprising an L* value range of 0<L*<8.

In some embodiments, the at least one roofing granule (e.g., the coated roofing granule, the plurality of the coated roofing granules, etc.), the granule coating, the roofing material, or any combination thereof has a CIELAB color value comprising an L* value range of 1<L*<50. In some embodiments, the at least one roofing granule (e.g., the coated roofing granule, the plurality of the coated roofing granules, etc.), the granule coating, the roofing material, or any combination thereof has a CIELAB color value comprising an L* value range of 1<L*<45. In some embodiments, the at least one roofing granule (e.g., the coated roofing granule, the plurality of the coated roofing granules, etc.), the granule coating, the roofing material, or any combination thereof has a CIELAB color value comprising an L* value range of 1<L*<40. In some embodiments, the at least one roofing granule (e.g., the coated roofing granule, the plurality of the coated roofing granules, etc.), the granule coating, the roofing material, or any combination thereof has a CIELAB color value range of 5<L*<40. In some embodiments, the at least one roofing granule (e.g., the coated roofing granule, the plurality of the coated roofing granules, etc.), the granule coating, the roofing material, or any combination thereof has a CIELAB color value comprising an L* value range of 10<L*<45. In some embodiments, the at least one roofing granule (e.g., the coated roofing granule, the plurality of the coated roofing granules, etc.), the granule coating, the roofing material, or any combination thereof has a CIELAB color value comprising an L* value range of 10<L*<40. In some embodiments, the at least one roofing granule (e.g., the coated roofing granule, the plurality of the coated roofing granules, etc.), the granule coating, the roofing material, or any combination thereof has a CIELAB color value comprising an L* value range of 15<L*<40. In some embodiments, the at least one roofing granule (e.g., the coated roofing granule, the plurality of the coated roofing granules, etc.), the granule coating, the roofing material, or any combination thereof has a CIELAB color value comprising an L* value range of 20<L*<40. In some embodiments, the at least one roofing granule (e.g., the coated roofing granule, the plurality of the coated roofing granules, etc.), the granule coating, the roofing material, or any combination thereof has a CIELAB color value comprising an L* value range of 25<L*<40. In some embodiments, the at least one roofing granule (e.g., the coated roofing granule, the plurality of the coated roofing granules, etc.), the granule coating, the roofing material, or any combination thereof has a CIELAB color value comprising an L* value range of 25<L*<45. In some embodiments, the at least one roofing granule (e.g., the coated roofing granule, the plurality of the coated roofing granules, etc.), the granule coating, the roofing material, or any combination thereof has a CIELAB color value comprising an L* value range of 30<L*<45. In some embodiments, the at least one roofing granule (e.g., the coated roofing granule, the plurality of the coated roofing granules, etc.), the granule coating, the roofing material, or any combination thereof has a CIELAB color value comprising an L* value range of 30<L*<40.

In some embodiments, the graphene is directly exposed to an environment. In some embodiments, the plurality of graphene particles is directly exposed to an environment. In some embodiments, the environment is an outdoor environment. In some embodiments, the environment is ambient condition(s).

Some embodiments relate to a roofing material. In some embodiments, the roofing material comprises a plurality of coated roofing granules. In some embodiments, each of the plurality of coated roofing granules comprises a roofing granule, a granule coating, and a plurality of graphene particles. In some embodiments, the roofing granule has an outer surface. In some embodiments, the granule coating is disposed on at least a portion of the outer surface of the roofing granule. In some embodiments, the granule coating has an outer surface. In some embodiments, the plurality of graphene particles is disposed on at least a portion of the outer surface of the granule coating.

Some embodiments relate to a roofing shingle. In some embodiments, the roofing shingle comprises a substrate, an asphalt filled coating, and a plurality of coated roofing granules. In some embodiments, the asphalt filled coating is disposed on a top surface of the substrate. In some embodiments, the plurality of coated roofing granules is disposed on a top surface of the asphalt filled coating. In some embodiments, each of the plurality of coated roofing granules comprises a roofing granule, a granule coating, and a plurality of graphene particles. In some embodiments, the roofing granule has an outer surface. In some embodiments, the granule coating is disposed on at least a portion of the outer surface of the roofing granule. In some embodiments, the granule coating has an outer surface. In some embodiments, the plurality of graphene particles is disposed on at least a portion of the outer surface of the granule coating.

Some embodiments relate to a roofing system. In some embodiments, the roofing system comprises a roofing substrate. In some embodiments, the roofing substrate is a roof deck. In some embodiments, the roofing substrate is an underlayment. In some embodiments, the roofing system comprises a plurality of roofing shingles. In some embodiments, each of the plurality of roofing shingles comprises a substrate, an asphalt filled coating, and a plurality of coated roofing granules. In some embodiments, the asphalt filled coating is disposed on a top surface of the substrate. In some embodiments, the plurality of coated roofing granules is disposed on a top surface of the asphalt filled coating. In some embodiments, each of the plurality of coated roofing granules comprises a roofing granule, a granule coating, and a plurality of graphene particles. In some embodiments, the roofing granule has an outer surface. In some embodiments, the granule coating is disposed on at least a portion of the outer surface of the roofing granule. In some embodiments, the granule coating has an outer surface. In some embodiments, the plurality of graphene particles is disposed on at least a portion of the outer surface of the granule coating.

A non-limiting example of a cross-section of at least a portion of a coated roofing granule 100 is shown in FIG. 1 according to some embodiments. As shown in FIG. 1, in some embodiments, the coated roofing granule 100 may comprise, consist of, or consist essentially of a roofing granule 102 and a graphene-containing granule coating 104. In the illustrated embodiment, the graphene-containing granule coating 104 is disposed on and covers at least a portion of a surface of the roofing granule 102.

Figure 2:
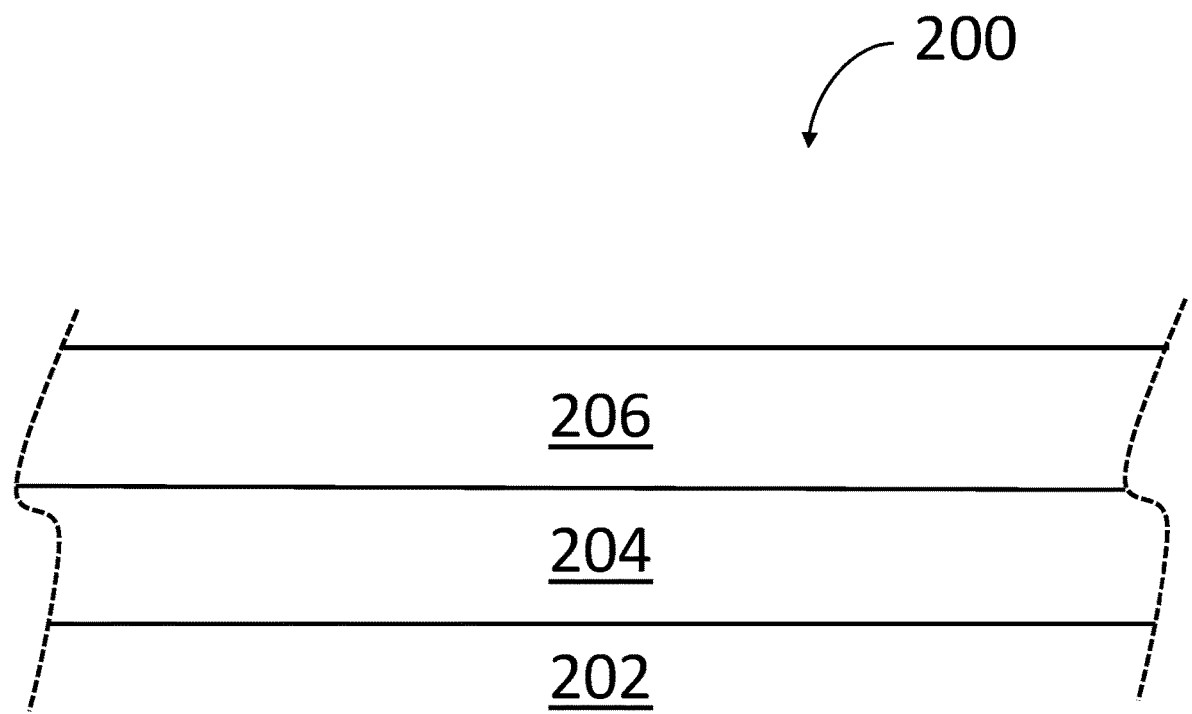
FIG. 2 is a cross-section of at least a portion of a coated roofing granule, according to some embodiments of the present disclosure.

A non-limiting example of a cross-section of at least a portion of a coated roofing granule 200 is shown in FIG. 2 according to some embodiments. As shown in FIG. 2, in some embodiments, the coated roofing granule 200 may comprise, consist of, or consist essentially of a roofing granule 202, a reflective base coating 204, and a graphene-containing granule coating 206. In the illustrated embodiment, the reflective base coating 204 is disposed on and covers at least a portion of a surface of the roofing granule 202, the graphene-containing granule coating 206 is disposed on and covers at least a portion of a surface of the roofing granule 202, and the reflective base coating 204 is positioned between a surface of the roofing granule 202 and the graphene-containing granule coating 206.

Figure 3:
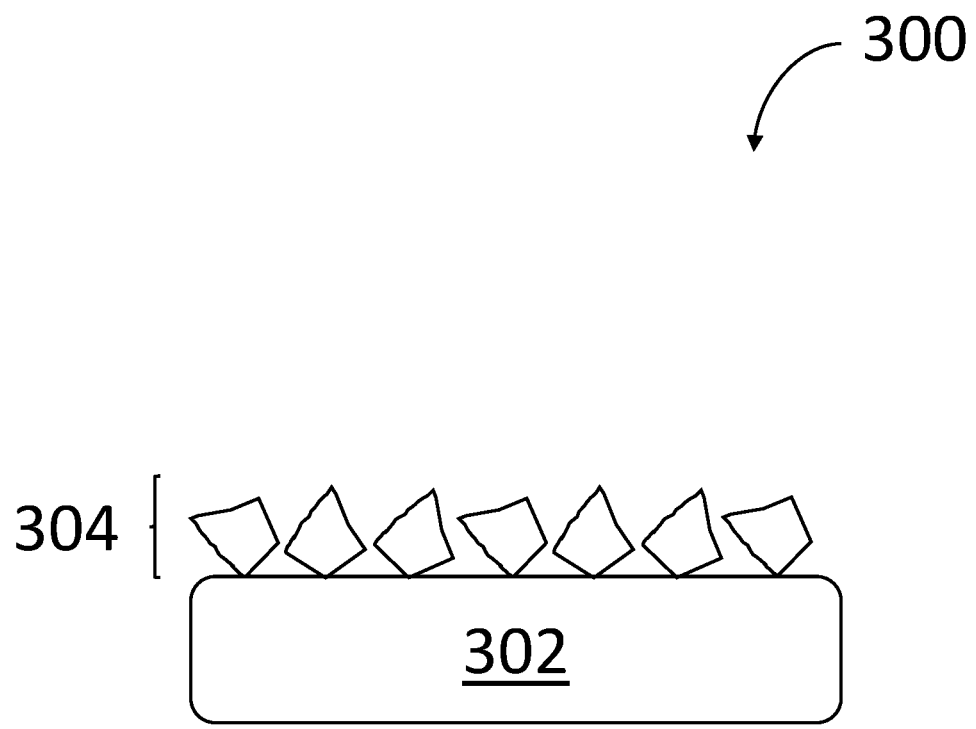
FIG. 3 is a cross-section of at least a portion of a roofing shingle, according to some embodiments of the present disclosure.

A non-limiting example of a cross-section of at least a portion of a roofing shingle 300 is shown in FIG. 3 according to some embodiments. As shown in FIG. 3, in some embodiments, the roofing shingle 300 may comprise, consist of, or consist essentially of a substrate 302 and a plurality of coated roofing granules 304. In the illustrated embodiment, the plurality of the coated roofing granules 304 is disposed on and covers at least a portion of a surface of the substrate 302.

In some embodiments, the roofing shingle 300 further comprises a coating layer (not shown) between the substrate 302 and the plurality of coated roofing granules 304. In some embodiments, the coating layer is an asphalt filled coating. In some embodiments, the asphalt filled coating comprises asphalt and at least one filler. In some embodiments, the asphalt filled coating does not comprise graphene. In some embodiments, the asphalt filled coating does not comprise graphite.

In some embodiments, the asphalt filled coating comprises 10% to 90% by weight of the asphalt based on a total weight of the asphalt filled coating. In some embodiments, the asphalt filled coating comprises 10% to 85% by weight of the asphalt based on the total weight of the asphalt filled coating. In some embodiments, the asphalt filled coating comprises 10% to 80% by weight of the asphalt based on the total weight of the asphalt filled coating. In some embodiments, the asphalt filled coating comprises 10% to 75% by weight of the asphalt based on the total weight of the asphalt filled coating. In some embodiments, the asphalt filled coating comprises 10% to 70% by weight of the asphalt based on the total weight of the asphalt filled coating. In some embodiments, the asphalt filled coating comprises 10% to 65% by weight of the asphalt based on the total weight of the asphalt filled coating. In some embodiments, the asphalt filled coating comprises 10% to 60% by weight of the asphalt based on the total weight of the asphalt filled coating. In some embodiments, the asphalt filled coating comprises 10% to 55% by weight of the asphalt based on the total weight of the asphalt filled coating. In some embodiments, the asphalt filled coating comprises 10% to 50% by weight of the asphalt based on the total weight of the asphalt filled coating. In some embodiments, the asphalt filled coating comprises 10% to 45% by weight of the asphalt based on the total weight of the asphalt filled coating. In some embodiments, the asphalt filled coating comprises 10% to 40% by weight of the asphalt based on the total weight of the asphalt filled coating. In some embodiments, the asphalt filled coating comprises 10% to 35% by weight of the asphalt based on the total weight of the asphalt filled coating. In some embodiments, the asphalt filled coating comprises 10% to 30% by weight of the asphalt based on the total weight of the asphalt filled coating. In some embodiments, the asphalt filled coating comprises 10% to 25% by weight of the asphalt based on the total weight of the asphalt filled coating. In some embodiments, the asphalt filled coating comprises 10% to 20% by weight of the asphalt based on the total weight of the asphalt filled coating. In some embodiments, the asphalt filled coating comprises 10% to 15% by weight of the asphalt based on the total weight of the asphalt filled coating.

In some embodiments, the asphalt filled coating comprises 15% to 90% by weight of the asphalt based on the total weight of the asphalt filled coating. In some embodiments, the asphalt filled coating comprises 20% to 90% by weight of the asphalt based on the total weight of the asphalt filled coating. In some embodiments, the asphalt filled coating comprises 25% to 90% by weight of the asphalt based on the total weight of the asphalt filled coating. In some embodiments, the asphalt filled coating comprises 30% to 90% by weight of the asphalt based on the total weight of the asphalt filled coating. In some embodiments, the asphalt filled coating comprises 35% to 90% by weight of the asphalt based on the total weight of the asphalt filled coating. In some embodiments, the asphalt filled coating comprises 40% to 90% by weight of the asphalt based on the total weight of the asphalt filled coating. In some embodiments, the asphalt filled coating comprises 45% to 90% by weight of the asphalt based on the total weight of the asphalt filled coating. In some embodiments, the asphalt filled coating comprises 50% to 90% by weight of the asphalt based on the total weight of the asphalt filled coating. In some embodiments, the asphalt filled coating comprises 55% to 90% by weight of the asphalt based on the total weight of the asphalt filled coating. In some embodiments, the asphalt filled coating comprises 60% to 90% by weight of the asphalt based on the total weight of the asphalt filled coating. In some embodiments, the asphalt filled coating comprises 65% to 90% by weight of the asphalt based on the total weight of the asphalt filled coating. In some embodiments, the asphalt filled coating comprises 70% to 90% by weight of the asphalt based on the total weight of the asphalt filled coating. In some embodiments, the asphalt filled coating comprises 75% to 90% by weight of the asphalt based on the total weight of the asphalt filled coating. In some embodiments, the asphalt filled coating comprises 80% to 90% by weight of the asphalt based on the total weight of the asphalt filled coating. In some embodiments, the asphalt filled coating comprises 85% to 90% by weight of the asphalt based on the total weight of the asphalt filled coating.

In some embodiments, the asphalt filled coating comprises 10% to 90% by weight of the at least one filler based on the total weight of the asphalt filled coating. In some embodiments, the asphalt filled coating comprises 10% to 85% by weight of the at least one filler based on the total weight of the asphalt filled coating. In some embodiments, the asphalt filled coating comprises 10% to 80% by weight of the at least one filler based on the total weight of the asphalt filled coating. In some embodiments, the asphalt filled coating comprises 10% to 75% by weight of the at least one filler based on the total weight of the asphalt filled coating. In some embodiments, the asphalt filled coating comprises 10% to 70% by weight of the at least one filler based on the total weight of the asphalt filled coating. In some embodiments, the asphalt filled coating comprises 10% to 65% by weight of the at least one filler based on the total weight of the asphalt filled coating. In some embodiments, the asphalt filled coating comprises 10% to 60% by weight of the at least one filler based on the total weight of the asphalt filled coating. In some embodiments, the asphalt filled coating comprises 10% to 55% by weight of the at least one filler based on the total weight of the asphalt filled coating. In some embodiments, the asphalt filled coating comprises 10% to 50% by weight of the at least one filler based on the total weight of the asphalt filled coating. In some embodiments, the asphalt filled coating comprises 10% to 45% by weight of the at least one filler based on the total weight of the asphalt filled coating. In some embodiments, the asphalt filled coating comprises 10% to 40% by weight of the at least one filler based on the total weight of the asphalt filled coating. In some embodiments, the asphalt filled coating comprises 10% to 35% by weight of the at least one filler based on the total weight of the asphalt filled coating. In some embodiments, the asphalt filled coating comprises 10% to 30% by weight of the at least one filler based on the total weight of the asphalt filled coating. In some embodiments, the asphalt filled coating comprises 10% to 25% by weight of the at least one filler based on the total weight of the asphalt filled coating. In some embodiments, the asphalt filled coating comprises 10% to 20% by weight of the at least one filler based on the total weight of the asphalt filled coating. In some embodiments, the asphalt filled coating comprises 10% to 15% by weight of the at least one filler based on the total weight of the asphalt filled coating.

In some embodiments, the asphalt filled coating comprises 15% to 80% by weight of the at least one filler based on the total weight of the asphalt filled coating. In some embodiments, the asphalt filled coating comprises 20% to 80% by weight of the at least one filler based on the total weight of the asphalt filled coating. In some embodiments, the asphalt filled coating comprises 25% to 80% by weight of the at least one filler based on the total weight of the asphalt filled coating. In some embodiments, the asphalt filled coating comprises 30% to 80% by weight of the at least one filler based on the total weight of the asphalt filled coating. In some embodiments, the asphalt filled coating comprises 35% to 80% by weight of the at least one filler based on the total weight of the asphalt filled coating. In some embodiments, the asphalt filled coating comprises 40% to 80% by weight of the at least one filler based on the total weight of the asphalt filled coating. In some embodiments, the asphalt filled coating comprises 45% to 80% by weight of the at least one filler based on the total weight of the asphalt filled coating. In some embodiments, the asphalt filled coating comprises 50% to 80% by weight of the at least one filler based on the total weight of the asphalt filled coating. In some embodiments, the asphalt filled coating comprises 55% to 80% by weight of the at least one filler based on the total weight of the asphalt filled coating. In some embodiments, the asphalt filled coating comprises 60% to 80% by weight of the at least one filler based on the total weight of the asphalt filled coating. In some embodiments, the asphalt filled coating comprises 65% to 80% by weight of the at least one filler based on the total weight of the asphalt filled coating. In some embodiments, the asphalt filled coating comprises 70% to 80% by weight of the at least one filler based on the total weight of the asphalt filled coating. In some embodiments, the asphalt filled coating comprises 75% to 80% by weight of the at least one filler based on the total weight of the asphalt filled coating. In some embodiments, the asphalt filled coating comprises 80% to 80% by weight of the at least one filler based on the total weight of the asphalt filled coating. In some embodiments, the asphalt filled coating comprises 85% to 80% by weight of the at least one filler based on the total weight of the asphalt filled coating.

In some embodiments, the at least one filler may comprise, consist of, or consist essentially of at least one organic filler, at least one inorganic mineral filler, or any combinations thereof. In some embodiments, the at least one filler may include one or more of calcium carbonate, barium sulfate, calcium sulfate, talc, limestone, perlite, silica, fumed silica, precipitated silica, quartz, aluminum trihydrate, magnesium hydroxide, magnesium dihydroxide, aluminum hydroxide, cellulosic material, lignin, ammonium polyphosphate, colemanite (e.g., hydrated calcium borate), hydrated lime, titanium dioxide, snow white (i.e., calcium sulfate), fly ash, graphene nanoparticles, carbon black, recycled rubber tires, recycled shingles, recycled thermoplastic resins, basalt, roofing granules, graphite, and clay.

Some embodiments of the present disclosure provide a method. In some embodiments, the method may relate to the preparation of at least one coated roofing granule comprising, consisting of, or consisting essentially of at least a graphene-containing granule coating.

Figure 4:
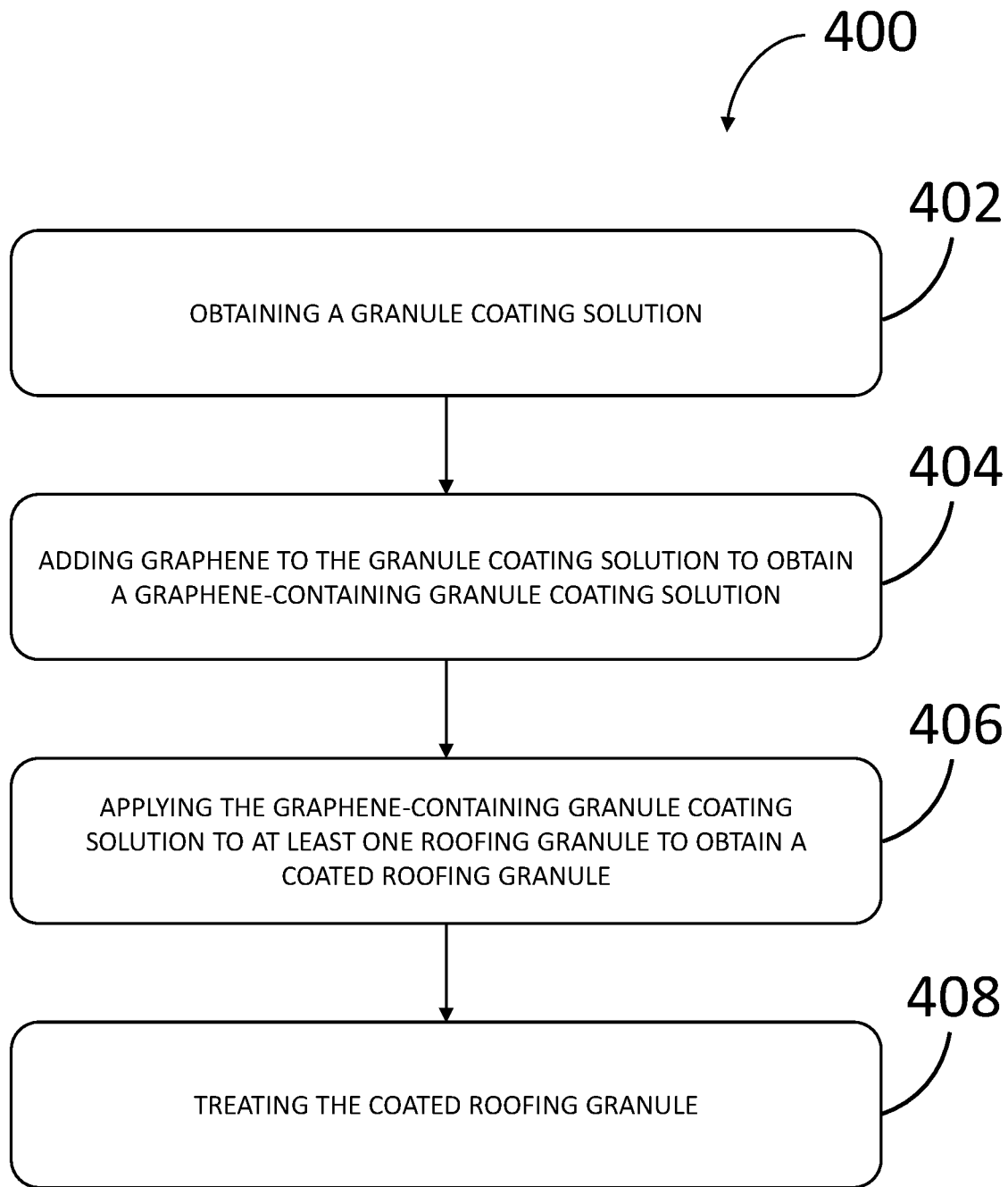
FIG. 4 is a flowchart of a method of preparing a coated roofing granule, according to some embodiments of the present disclosure.

A non-limiting example of a method of preparing a coated roofing granule 400 is shown in FIG. 4 according to some embodiments. As shown in FIG. 4, the method of preparing the coated roofing granule 400 may comprise, consist of, or consist essentially of at least one of the following steps: a step 402 of obtaining a granule coating solution, a step 404 of adding graphene to the granule coating solution to obtain a graphene-containing granule coating solution, a step 406 of applying the graphene-containing granule coating solution to at least one roofing granule to obtain a coated roofing granule, a step 408 of treating the coated roofing granule, or any combination thereof. In some embodiments, the coating solution may comprise, consist of, or consist essentially of the at least one additive. In some embodiments, the granule coating solution may form a slurry, a suspension, a dispersion, an emulsion, an aqueous solution, an organic solution, or any combination thereof. In some embodiments, the graphene is added to the granule coating solution in step 404 under agitation. In some embodiments, the graphene-containing granule coating solution is the granule coating material. In some embodiments, the graphene-containing granule coating solution is applied to the at least one roofing granule via at least one of the following coating methods: a pan coater, a tumbling coater, a spray coater, a curtain coater, a dipping, a fluidized bed coater, a rotary blender, or any combination thereof. In some embodiments, the step 408 of treating the coated roofing granules may comprise curing the coated roofing granule. In some embodiments, the curing may proceed at a temperature of 600° C. or less, 525° C. or less, or 500° C. or less, among others.

In some embodiments, a method comprises one or more of the following steps: obtaining a plurality of roofing granules; obtaining a granule coating material; obtaining a graphene composition, wherein the graphene composition comprises a plurality of graphene particles; applying the granule coating material to the plurality of roofing granules so as to form a plurality of coated roofing granules; applying the graphene composition to the plurality of coated roofing granules such that the plurality of graphene particles covers at least a portion of the plurality of coated roofing granules; heating the plurality of coated granules to a first temperature. In some embodiments, the graphene composition is graphene powder. In some embodiments, the graphene composition comprises a plurality of graphene particles dispersed in a liquid media. In some embodiments, the applying comprises at least one of mixing, coating, tumbling, brushing, spraying, rolling, or any combination thereof. In some embodiments, the applying comprises at least one of a brushing on application, a roll transfer application, a fabric roll application, an air brush application, or any combination thereof.

In some embodiments, the first temperature is a temperature of 350° C. to 650° C. In some embodiments, the first temperature is a temperature of 350° C. to 625° C. In some embodiments, the first temperature is a temperature of 350° C. to 600° C. In some embodiments, the first temperature is a temperature of 350° C. to 575° C. In some embodiments, the first temperature is a temperature of 350° C. to 550° C. In some embodiments, the first temperature is a temperature of 350° C. to 525° C. In some embodiments, the first temperature is a temperature of 350° C. to 500° C. In some embodiments, the first temperature is a temperature of 350° C. to 475° C. In some embodiments, the first temperature is a temperature of 350° C. to 450° C. In some embodiments, the first temperature is a temperature of 350° C. to 425° C. In some embodiments, the first temperature is a temperature of 350° C. to 400° C. In some embodiments, the first temperature is a temperature of 350° C. to 375° C.

In some embodiments, the first temperature is a temperature of 375° C. to 650° C. In some embodiments, the first temperature is a temperature of 400° C. to 650° C. In some embodiments, the first temperature is a temperature of 425° C. to 650° C. In some embodiments, the first temperature is a temperature of 450° C. to 650° C. In some embodiments, the first temperature is a temperature of 475° C. to 650° C. In some embodiments, the first temperature is a temperature of 500° C. to 650° C. In some embodiments, the first temperature is a temperature of 525° C. to 650° C. In some embodiments, the first temperature is a temperature of 550° C. to 650° C. In some embodiments, the first temperature is a temperature of 575° C. to 650° C. In some embodiments, the first temperature is a temperature of 600° C. to 650° C. In some embodiments, the first temperature is a temperature of 625° C. to 650° C.

Example 1

Sample 1 (Comparative)

100 gm of mineral particles were coated with 4 gm of a sodium silicate coating. The coating did not comprise graphene. The coating was applied to the mineral particles via a tumbler and subsequently dried by an air stream. The resultant granules had a dark color. The CIE LAB color data was measured. The total solar reflectance was measured according to ASTM E903. The color data and total solar reflectance data for these coated granules is presented in Table 1 below as Sample 1.

Example 2

Sample 2

100 gm of mineral particles were coated with 4 gm of a water-based polyurethane coating which contained 0.4 gm of graphene powder. The graphene was added into the coating by direct mixing using a lab mixer. The resultant coating was applied to the mineral particles via a tumbler and subsequently dried by an air stream. The resultant granules had a dark color. The CIE LAB color data for the resultant granules was measured. The total solar reflectance for the resultant granules was measured according to ASTM E903. The color data and total solar reflectance data for these coated granules is presented in Table 1 below as Sample 2.

TABLE 1

| Sample ID | Graphene Amount in Granules, wt % | Coating Type | Color | | | Total Solar Reflectance |
| | | | $L^*$ | $a^*$ | $b^*$ | |
| --- | --- | --- | --- | --- | --- | --- |
| 1 | — | sodium silicate | 30.5 | −0.9 | −0.5 | 0.07 |
| 2 | 0.4 | polyurethane | 25.4 | −2.0 | 4.3 | 0.05 |
| 3 | 0.3 | sodium silicate | 36.8 | −0.6 | 2.1 | 0.10 |
| 4 | 0.3 | sodium silicate | 45.4 | −1.2 | 3.5 | 0.15 |

Example 3

Sample 3

100 gm of the same mineral particles as in Example 2 were coated with a sodium silicate coating containing graphene powder. 16.7 gm of the coating was first mixed with 0.7 gm of water and 2 gm of kaolin clay in a mixer, followed by the addition of 0.3 gm of the same graphene as in Example 1. The resultant coating was applied to the mineral particles in a rotating tumbler and dried by an air stream. The resultant granules were heat treated at 500° C. to insolubilize the coating. The CIE LAB color data for the finished granules was measured. The total solar reflectance for the finished granules was measured according to ASTM E903. The color data and total solar reflectance data for these coated granules is presented in Table 1 below as Sample 3.

Example 4

Sample 4

The same coating as in Example 3 was prepared for coating 100 gm of the same mineral particles as in Example 3, except the method of application was different. More specifically, the graphene was not added directly into the coating. The sodium silicate coating without the graphene was first mixed with the granules or the mineral particles in a tumbler for about one minute, and then dry graphene powder was added via an air brush spray as the mixing continued. After uniform mixture was observed, the granules were then heat treated at 500° C. to cure the coating. The CIE LAB color data for the finished granules was measured. The total solar reflectance for the finished granules was measured according to ASTM E903. The color data and total solar reflectance data for these coated granules is presented in Table 1 below as Sample 4. The resultant granules had a majority of the graphene particles on the coating surface which led to higher solar reflectance of 0.15 (Sample 4 in Table 1).

What is claimed is:

1. A roofing shingle comprising:
  a substrate;
  an asphalt filled coating on the substrate; and
  a plurality of coated roofing granules disposed on the asphalt filled coating, wherein each of the plurality of coated roofing granules comprises:
    a roofing granule,
      wherein the roofing granule consists of a mineral,
        wherein the mineral is selected from the group consisting of greenstone, nephelene syenite, gravel, slate, gannister, quartz, quartzite, greystone, argillite, coal slag, copper slag, nickel slag, ceramic grog, talc, granite, siliceous sand, andesite, porphyry, marble, syenite, rhyolite, diabase, quartz, slate, basalt, sandstone, marine shell, a material derived from a brick, a material derived from a concrete, a material derived from a porcelain, and any combination thereof; and
    a coating,
      wherein the coating is disposed on at least a portion of an outer surface of the roofing granule;
      wherein the coating directly contacts the at least a portion of the outer surface of the roofing granule;
      wherein the coating comprises:
        0.1% to 9% by weight of a graphene based on a total weight of the coating,
          wherein the graphene is present in the coating such that at least a portion of the graphene is directly exposed to an environment;
          wherein the graphene is present in the coating in an amount such that, when measured according to ASTM E903, a total solar reflectance of the plurality of coated roofing granules is greater than a total solar reflectance of a plurality of control coated roofing granules, wherein the plurality of control coated roofing granules does not comprise graphene;
        at least one binder; and
        at least one polymer.

2. The roofing shingle of claim 1, wherein the coating comprises 0.1% to 5% by weight of the graphene based on the total weight of the coating.

3. The roofing shingle of claim 1, wherein the coating comprises 0.1% to 1% by weight of the graphene based on the total weight of the coating.

4. The roofing shingle of claim 1, wherein the at least one binder comprises at least one of a sodium silicate, a potassium silicate, an ammonium silicate, a lithium silicate, a magnesium silicate, a calcium silicate, an aluminum silicate, a titanium silicate, or any combination thereof.

5. The roofing shingle of claim 1, wherein the at least one binder comprises at least one of an acrylic polymer, a polyurethane, a fluoropolymer, or any combination thereof.

6. The roofing shingle of claim 1, wherein the coating further comprises at least one of a latent heat reactant, a dispersing agent, a curing agent, an accelerator, a viscosity modifier, a color pigment, or any combination thereof.

7. The roofing shingle of claim 1, wherein the coating covers at least 25% to 100% of the outer surface of the roofing granule.

8. The roofing shingle of claim 1, wherein the at least one binder and the at least one polymer are different.

9. The roofing shingle of claim 1, wherein the coating has a thickness of 0.1 mil to 50 mil.

10. The roofing shingle of claim 1, wherein the graphene is present in the coating such that the graphene covers at least 10% of the outer surface of the roofing granule.

11. A roofing material comprising:
  a substrate;
  an asphalt filled coating on the substrate; and
  a plurality of coated roofing granules disposed on the asphalt filled coating, wherein each of the plurality of coated roofing granules comprises:
    a roofing granule,
      wherein the roofing granule consists of a mineral,
        wherein the mineral is selected from the group consisting of greenstone, nephelene syenite, gravel, slate, gannister, quartz, quartzite, greystone, argillite, coal slag, copper slag, nickel slag, ceramic grog, talc, granite, siliceous sand, andesite, porphyry, marble, syenite, rhyolite, diabase, quartz, slate, basalt, sandstone, marine shell, a material derived from a brick, a material derived from a concrete, a material derived from a porcelain, and any combination thereof; and
    a coating,
      wherein the coating is disposed on at least a portion of an outer surface of the roofing granule;
      wherein the coating directly contacts the at least a portion of the outer surface of the roofing granule;
      wherein the coating comprises a graphene, at least one binder, and at least one polymer;
        wherein the graphene is present in the coating such that at least a portion of the graphene is directly exposed to an environment;
        wherein, when measured according to ASTM E903, the graphene is present in the coating in an amount sufficient to increase a total solar reflectance of the plurality of coated roofing granules by at least 40% relative to a plurality of control roofing granules, wherein the plurality of control roofing granules does not comprise graphene.

12. The roofing material of claim 11, wherein the coating comprises 0.1% to 9% by weight of the graphene based on a total weight of the coating.

13. The roofing material of claim 11, wherein the coating comprises 0.1% to 1% by weight of the graphene based on a total weight of the coating.

14. The roofing material of claim 11, wherein the at least one binder comprises at least one of a sodium silicate, a potassium silicate, an ammonium silicate, a lithium silicate, a magnesium silicate, a calcium silicate, an aluminum silicate, a titanium silicate, or any combination thereof.

15. The roofing material of claim 11, wherein the at least one binder comprises at least one of an acrylic polymer, a polyurethane, a fluoropolymer, or any combination thereof.

16. The roofing material of claim 11, wherein the coating further comprises at least one of a latent heat reactant, a dispersing agent, a curing agent, an accelerator, a viscosity modifier, a color pigment, or any combination thereof.

17. The roofing material of claim 11, wherein the coating covers at least 25% to 100% of the outer surface of the roofing granule.

18. The roofing material of claim 11, wherein the at least one binder and the at least one polymer are different.

19. The roofing material of claim 11, wherein the coating has a thickness of 0.1 mil to 50 mil.

20. The roofing material of claim 11, wherein the graphene is present in the coating such that the graphene covers at least 10% of the outer surface of the roofing granule.

* * * * *